(12) United States Patent
Sutherland et al.

(10) Patent No.: US 6,356,117 B1
(45) Date of Patent: Mar. 12, 2002

(54) ASYNCHRONOUSLY CONTROLLING DATA TRANSFERS WITHIN A CIRCUIT

(75) Inventors: Ivan E. Sutherland, Santa Monica; Scott M. Fairbanks, Mountain View; Josephus C. Ebergen, San Francisco, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/676,428

(22) Filed: Sep. 29, 2000

(51) Int. Cl.[7] .............................................. H03K 19/00
(52) U.S. Cl. .............................. 326/93; 326/95; 326/94
(58) Field of Search .............................. 326/93–98, 112, 326/119, 121

(56) References Cited

U.S. PATENT DOCUMENTS 5,550,490 A * 8/1996 Durham et al. ................ 326/98
6,166,564 A * 12/2000 Rosen ........................... 326/93

OTHER PUBLICATIONS

Article entitled "Single–Track Handshake Signaling with Application to Micropipelines and Handshake Circuits", by Kees van Berkel and Arjan Bink, Phillips Research Laboratories, Eindhoven, The Netherlands, Sep. 1995.

Article entitled "Asynchronous Interlocked Pipelined CMOS Circuits Operating at 3.3–4.5GHz", by Stanley Schuster, et al., IBM Research Div., Watson Research Center, Yorktown Heights, NY.

* cited by examiner

*Primary Examiner*—Michael Tokar
*Assistant Examiner*—Anh Q. Tran
(74) *Attorney, Agent, or Firm*—Park, Vaughan & Fleming LLP

(57) ABSTRACT

One embodiment of the present invention provides a system for controlling asynchronous data transfers within a circuit. This system operates by monitoring a first voltage level on a first conductor that specifies whether a first stage of the circuit contains data. The system also monitors a second voltage level on a second conductor that specifies whether a second stage of the circuit contains data. Upon detecting that the first voltage level indicates that first stage contains data to be transmitted to the second stage, and that the second voltage level indicates that the second stage does not contain data, and is therefore available to receive data from the first stage, the system transfers the data from the first stage to the second stage. This is accomplished by generating a second stage latch signal to latch data into the second stage from the first stage. It also involves changing the first voltage level to indicate that the first stage no longer contains data, and changing the second voltage level to indicate that the second stage contains data.

20 Claims, 18 Drawing Sheets

(INPUT-LIMITED OPERATION)

(OUTPUT-LIMITED OPERATION)

(MAXIMUM THROUGHPUT OPERATION)

(INPUT-LIMITED OPERATION)

(OUTPUT-LIMITED OPERATION)

(MAXIMUM THROUGHPUT OPERATION)

ASYNCHRONOUSLY CONTROLLING DATA TRANSFERS WITHIN A CIRCUIT

RELATED APPLICATIONS

The subject matter of this application is related to the subject matter in a non-provisional application filed on the same day as the instant application by inventor Josephus C. Ebergen, entitled "Asynchronous Implementation of a Multi-Dimensional, Low-Latency, First-In, First-Out (FIFO) Buffer," having Ser. No. 09/677,442, and filing date Sept. 29, 2000. The subject matter of this application is also related to the subject matter in a non-provisional application filed on the same day as the instant application by inventors Ivan E. Sutherland, Scott M. Fairbanks and Josephus C. Ebergen, entitled "Method and Apparatus for Asynchronously Controlling State Information within a Circuit," having Ser. No. 09/676,430, and filing date Sept. 29, 2000. The instant application hereby incorporates by reference the above-listed patent applications.

BACKGROUND

1. Field of the Invention

The present invention relates to the design of digital circuits. More specifically, the present invention relates to a method and an apparatus for controlling state information within a circuit.

2. Related Art

Finite state machines are familiar to every designer of computer equipment. They are easy to describe and generally easy to implement. Such a machine can be in any one of a number of "states". Most implementations use a set of "state flip-flops" to hold the present state of the finite state machine.

For each state there are a set of conditions that will cause the finite state machine to change from that state to some other state. The conditions examined in each state may be unique to that state or shared with other states. The state to which the device changes depends on the state it is in, the conditions examined in that state, and which conditions are TRUE.

For example, a simple up-down counter is a finite state machine. Its states are the finite number of count values that it can hold. The conditions examined in each state are "count up" and "count down". The up-down counter advances from its present state to the next higher count value when it gets the "count up" condition and advances to the next lower count value when it finds the "count down" condition. Depending on the design it may have a highest state in which it can only count down or a lowest state in which it can only count up or both.

Finite state machines typically use externally-clocked flip-flops to hold their state. Logic elements examine the conditions pertinent to the present state, and upon the arrival of each external clock pulse, set or clear selected clocked flip-flops to establish the next state. The design of such externally-clocked finite state machines is relatively easy, because all flip-flops change, if at all, only in response to the same external clock signal. Thus, for example, it is acceptable to change the state of several flip-flops at once, for example as happens in a binary counter when the "carry" passes through several stages, returning them all to the "zero" state. Were the flip-flops of the counter not clocked externally, the process of changing several flip-flops might cause the counter for a short interval to assume one or more intermediate states outside the proper binary sequence.

Indeed, some simple finite state machines, including binary counters are often built without an external clock for their flip-flops. In such counters, called "ripple counters," the state flip-flops that hold the count each act independently. The flip-flop holding each bit of the count changes its state in response to changes from "one" to "zero" in the flip-flop that holds the bit representing half its value. Thus, for example, when a six bit ripple counter changes from 001111 to 010000, it will momentarily assume the states 001110, 001100, 001000, 010000 in rapid succession even though they are out of sequence. It is well known to those familiar with ripple counters that one must exercise care in their application because such FALSE states appear in their flip-flops, albeit for very short intervals of time. For finite state machines of any complexity, the simplicity of externally-clocked flip-flops is much preferred.

One aspect of all finite state machines involves the mapping of the allowed states of the machine onto the possible states of the flip-flops that retain the state. Such a mapping is called the "state encoding" used for the finite state machine because it defines the meaning of each possible state of the flip-flops. The encoding may also rule out certain combinations of flip-flop states as outside the range permitted for that finite state machine.

There are two particularly simple encodings. First, some finite state machines use a "one-out-of-N" encoding in which only one state flip-flop is "set" for each state. This encoding rules out the state with no state flip-flops set as well as all states with more than one state flip-flop set. With the one-out-of-N encoding, each change of state sets the state flip-flop associated with the new state and clears the state flip-flop associated with the old state. The one-out-of-N state encoding, though simple, is impractical for finite state machines with large numbers of states.

A second simple state encoding is a binary state encoding. In this state encoding each state is defined by a binary combination of state flip-flops that are set and that are clear. The binary encoding permits all combinations. This encoding is suitable for some finite state machines such as the binary counter already mentioned. It has the problem, however, that some state changes may require simultaneously setting many state flip-flops and clearing many others. The need to change many state flip-flops simultaneously renders binary encoding unsuitable for some applications. Designers have learned to choose encodings suitable to the needs of each particular application.

Finite state machines use complex logic elements to control the set and clear functions of individual flip-flops. These conditions cause "transitions" in the state of the finite state machine. The collection of conditions that must be TRUE to cause a particular transition must first be combined by a logical AND function. The output of this logic function will be TRUE when all relevant conditions are TRUE. Such a function indicates an impending state transition. Next, depending on the particular encoding used, several state flip-flops may have to change for such a state transition, some being set and some being cleared. The state transition logic must deliver its output to all such state flip-flops. Finally, it is likely that several transition functions apply to some state flip-flops. Such multiple transition functions must be combined with logical OR circuits to drive the inputs of the externally-clocked state flip-flops.

In spite of the complexity of such finite state machine implementations, they are so familiar to designers today that they are widely used. Indeed there are even computer automated design methods to help designers develop the required logic from equations describing the desired behavior. The software commonly used to design finite state machines depends on the use of externally-clocked flip-flops as the medium for holding the state.

The methods currently in use for designing finite state machines evolved over a long period of time. They were developed initially for use in machines built from vacuum tubes or even earlier for machines built from relays. They have served well into the era of transistor machines, but only to the extent that the more modern technologies are used in ways similar to those of the older technologies. Thus, the use of clocked flip-flops to hold state, for example, is a form that has survived several changes in the circuit elements and circuits used to implement such flip-flops.

Now, however, most digital computing devices use complementary metal oxide semiconductor (CMOS) circuits. In current CMOS circuits the cost of wires rather than the cost of logic gates dominates area, power consumption and performance. Almost all the space in a modern CMOS circuit is occupied by interconnect wiring; the transistors forming the logic gates generally fit underneath the wires required to interconnect them. The power consumption of the circuit is dominated by the need to put electrical charge onto the wires and later to remove it. The performance of the circuits is limited largely by the time it takes to charge and discharge the wires.

Moreover, in CMOS circuits, electrical capacitance can serve a state-holding function that previously had to be done with logic elements formed into flip-flops. Indeed, the dynamic random access memory (DRAM) industry has honed to a fine level the use of capacitance to store information. In a DRAM the electrical charge stored on a tiny capacitor serves to record each bit of information. However, in other CMOS circuits, the charge on any wire can also serve to store information.

Designers use such electrical charges stored on wires in making "dynamic" circuits. Dynamic circuits depend for their operation on the retention of information in electrical charges on wires. Dynamic circuits are possible in CMOS because the control input of a CMOS transistor, the "gate" of the transistor, operates on charge rather than current. An electric charge placed on the gate of a transistor will continue to condition the behavior of the transistor for a relatively long period until the charge gradually "leaks" off.

SUMMARY

The present invention uses such dynamic charge storage as the basis for a variety of finite state machines. It notes that charge placed on a CMOS conductor that connects to a number of transistor gates will condition those gates, and continue to do so for a relatively long time. Instead of storing the state of a finite state machine in a collection of state flip-flops, the present invention stores the state of a finite state machine on a set of state conductors, using the capacitive charge on those conductors to hold the state.

Unlike a state flip-flop, which is geometrically local, such a state conductor can be distributed geometrically over a wide area. It can be extended to whatever length is desired, turn corners or branch as needed, and can connect together as many components as desired. To change the state of a state flip-flop requires bringing the output of the transition logic to the state flip-flop. A state transition wire connects from the state transition logic to the state flip-flop. In contrast, to change the charge on a state conductor requires only that the state conductor be driven to the new state from anywhere along its length. The state conductor will automatically communicate the new state throughout its length.

Moreover in CMOS technology a state conductor will retain its charge state for a relatively long time. If the state must be retained indefinitely, a small "keeper" can be attached to the wire. Such a keeper gently drives the wire towards its most positive state if it is already positive and gently drives it towards its most negative state if it is already negative. The keeper is sufficiently weak that it is unable to resist the intentional state changes imposed by operation of the finite state machine, but just strong enough to counteract the tiny leakage currents and the effects of electrical "noise" that might otherwise disturb the charge stored on the conductor and thus improperly change its state.

Another advantage of using the charge on a state conductor to store state is the ability to use individual transistors to change its charge state. We will call such transistors "drive transistors." The two types of transistors used in CMOS circuits, N-type and P-type, drive their outputs in different directions. One or more N-type drive transistors connected anywhere along the length of a state conductor can drive it to the "LO" state, and likewise one or more P-type drive transistors connected anywhere along the state conductor can drive it to the "HI" state. Because the drains of these drive transistors each contribute capacitance to the conductor, attaching them to the conductor actually increases the ability of the conductor to store charge, thus enhancing its ability to retain state!

Moreover, if several transition conditions each must cause the state to change, several separate N-type or P-type drive transistors can be attached to the state conductor to condition it properly. The conductor goes to the LO state in response to any N-type drive transistor anywhere along its length. Likewise the conductor goes to the HI state in response to any P-type drive transistor anywhere along its length. State conductors will often accommodate more than one N-type and more than one P-type drive transistor.

It is important, however, that the N-type drive transistors and the P-type drive transistors for a single state conductor must never act simultaneously. Simultaneous drive by both types of drive transistors would represent a logical conflict, some attempting to make the state conductor HI and some attempting to make it LO. Were such conflict to occur, two bad things would happen. First, excess current would flow from the power supply to ground, consuming energy unnecessarily. Second, the charge left on the conductor might be uncertain, it not having been certain which should prevail, the N-type drive transistors, yielding the LO state, or the P-type drive transistors, yielding the HI state.

The present invention addresses this requirement to avoid conflicting drivers. Each state transition will occur when one or more N-type drive transistors connected to a particular state conductor act or one or more P-type drive transistors connected to that state conductor act. Of course, depending on the encoding chosen, several state conductors might change state at the same time, some driven by N-type drive transistors and others by P-type drive transistors, as required by the design. However, in no case will both the N-type and P-type drive transistors of a single state conductor act together.

Consider also energy consumption, another matter addressed by the present invention. In CMOS circuits a principle consumption of energy is to charge and discharge the capacitance of wires. The amount of energy consumed for an action, charging or discharging a wire, involves the capacitance of the wire which depends, of course, on its length. Thus the power consumed depends on how many charge and discharge cycles happen per unit of time and upon the length of the wires thus charged or discharged.

In a CMOS finite state machine that uses externally-clocked flip-flops there are three consumers of energy. First, the wires that carry the external clock connect to each of the state flip-flops. These clock wires charge and discharge each clock cycle, whether or not the state of the machine changes. Second, the transition wires that deliver transition commands to the flip-flops extend from the sources of the conditions to the state flip-flop. The transition wires charge and discharge in response to the transition logic. Each transition wire assumes one state before its transition can occur and returns to a neutral state after its transition, two changes per transition. Finally, the wires that report the state of the state flip-flop must extend from the state flip-flop to whatever circuits require knowledge of its state. These state flip-flop output wires change once per state transition.

In a CMOS finite state machine according to the present invention, however, the situation is quite different. First, there is no external clock, which eliminates the space and the energy consumed by the clock wires. Second, rather than localizing the state in the state flip-flops, the present invention distributes the state geometrically over the state conductors. Just as the output wires of state flip-flops extend to whatever needs knowledge of the state of the state flip-flops, the state conductor extends to wherever knowledge of the state is needed. Third, in contrast to systems using state flip-flops, the present invention extends the state conductor to the state transition logic rather than having a separate wire connecting the state transition logic to the state flip-flop. The length of wire required to extend the state conductor to the state transition logic is never longer that the transition wire would have been, and may be much shorter because it need run only from the transition logic to the nearest part of the existing state conductor. Moreover, this wire charges or discharges only once for each state transition rather than twice, thus saving energy.

Hence, instead of using two wires, one to carry transition information to the state flip-flop input and one to carry the state flip-flop output to where it is needed, the present invention uses only one wire, the state conductor, for both purposes. Drive transistors connected anywhere along the length of the state conductor change its state as needed. This reduction in complexity reduces both the total amount of wire required to implement the finite state machine and the energy consumed as it operates.

One embodiment of the present invention provides a system for asynchronously controlling state information within a circuit. This system includes a first conductor that carries a voltage that indicates a state of the circuit, as well as a first drive circuit coupled to the first conductor that is configured to drive the first conductor to a first voltage level to indicate a first state. The system also includes a second drive circuit coupled to the first conductor that is configured to drive the first conductor to a second voltage level to indicate a second state. The system additionally includes a condition input that indicates a condition. The system is configured so that the first drive circuit drives the first conductor to the first voltage level based upon the condition indicated by the condition input.

In one embodiment of the present invention, the first drive circuit is additionally configured to drive the first conductor to the first voltage level based upon the state indicated by the voltage carried on the first conductor.

In one embodiment of the present invention, the system additionally includes a keeper circuit coupled to the first conductor that is configured to hold the voltage on the first conductor at a stable value, unless the voltage is changed by the first drive circuit or the second drive circuit.

In one embodiment of the present invention, the system additionally includes a pulse generation circuit coupled to the first drive circuit, wherein the pulse generation circuit is configured to cause the first drive circuit to drive the first conductor to the first voltage level using a pulse of limited duration.

In one embodiment of the present invention, the pulse generation circuit includes a cycle of logical inversions to create the pulse. In a variation on this embodiment, the cycle of logical inversions provides an odd number of inversions. In another variation on this embodiment, the cycle of logical inversions provides three inversions. In yet another variation on this embodiment, the cycle of logical inversions provides five inversions.

In one embodiment of the present invention, the pulse generation circuit includes a circuit that implements an AND function.

In one embodiment of the present invention, the voltage on the first conductor can be changed by driving the first conductor at any point along a length of the first conductor.

In one embodiment of the present invention, the system includes additional drive circuits coupled to the first conductor.

In one embodiment of the present invention, the system includes additional condition inputs that are configured to influence the first drive circuit.

In one embodiment of the present invention, the first drive circuit includes one of, a P-type transistor and an N-type transistor.

In one embodiment of the present invention, the first drive circuit includes a series stack of drive transistors.

One embodiment of the present invention provides a system for controlling asynchronous data transfers within a circuit. This system operates by monitoring a first voltage level on a first conductor that specifies whether a first stage of the circuit contains data. The system also monitors a second voltage level on a second conductor that specifies whether a second stage of the circuit contains data. Upon detecting that the first voltage level indicates that first stage contains data to be transmitted to the second stage, and that the second voltage level indicates that the second stage does not contain data, and is therefore available to receive data from the first stage, the system transfers the data from the first stage to the second stage. This is accomplished by generating a second stage latch signal to latch data into the second stage from the first stage. It also involves changing the first voltage level to indicate that the first stage no longer contains data, and changing the second voltage level to indicate that the second stage contains data.

In a variation on the above embodiment, the system additionally monitors a third voltage level on a third conductor that specifies whether a third stage of the circuit contains data. Upon detecting that the second voltage level indicates that second stage contains data to be transmitted to the third stage, and that the third voltage level indicates that the third stage does not contain data, and is therefore available to receive data from the second stage, the system transfers the data from the second stage to the third stage.

DETAILED DESCRIPTION

Figure 1:
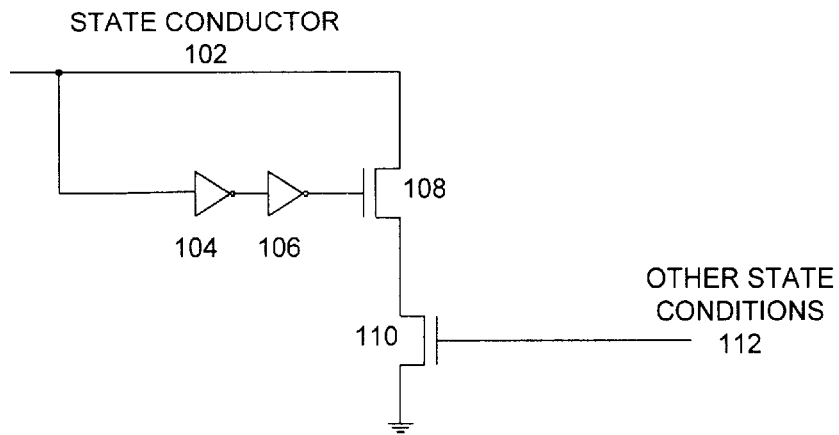
FIG. 1 illustrates an asynchronous circuit that holds state information on a conductor in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention can involve four parts: one or more state conductors, at least two drive transistors connected to each state conductor, one or more condition inputs, and one or more pulse-generating circuits. A pulse generating circuit is associated with each state transition of the finite state machine. Each pulse circuit may use as its inputs any of the condition inputs and any of the state conductors. Each pulse circuit generates a pulse when it detects a certain set of values on its inputs. The pulse thus generated activates N-type or P-type drive transistors to drive one or more of the state conductors as required for the particular design, thus causing the desired change in state. If desired, any or all of the state conductors may have a "keeper" attached to prevent slow discharge of the electric charge placed on it by the drive transistors activated by the pulse circuits. Said keeper must be weak enough to avoid interfering with the actions of the drive transistors.

Note that a keeper circuit can be implemented as a weak driver in the form of two inverters connected together in series with an input and an output coupled to the same state conductor. In this configuration, the voltage level that is present on the conductor is reinforced by the driver circuit. The strength of the driver is limited so that a stronger drive circuit can easily change the voltage level on the conductor in spite of the keeper circuit.

The pulse circuits used in the present invention activate the drive transistors long enough to change reliably the charge on the state conductors and thus to change the state of the finite state machine. However, the drive action ceases promptly enough to avoid interfering with opposing drive initiated by some other pulse circuit.

Thus, the timing of the pulse circuits in the present invention is important. Various circuit forms are possible, some faster than others. In general timing must be more carefully considered for faster circuits than in slower ones.

Because the present invention uses pulse-generating circuits to cause state transitions, it is free of an external clock signal. This freedom makes it applicable to a variety of self-timed or asynchronous circuits such as pipelines and First In First Out register circuits called FIFOs. A variety of such circuits are illustrated in the disclosure that follows.

Note that if the use of an external clock is mandatory, this external clock signal can be treated as one of the condition inputs to the pulse circuits. Including an external clock signal as a condition input can ensure that the state conductors change state only at times specified by the external clock signal.

The pulse generating circuit consists primarily of a logical AND function. This logical AND function combines the conditions necessary for the state changing event that it represents. The logical AND function may be implemented in any of a number of forms, including using NAND gates or NOR gates, as will be explained later. In addition to the logical AND function the pulse generating circuit contains a number of inverters serving a number of functions. First, the inverters place input conditions into the correct logical sense relative to the logical AND function. Second, the inverters place the output of the logical AND function in the correct logical sense to activate the N-type or P-type drive transistors. Third, the inverters provide short delays to ensure correct timing of the pulse. And fourth, the inverters provide electrical amplification to reduce the input current requirement of certain inputs.

One aspect of the present invention involves careful choice of the size of the transistors in these inverters, the size of the transistors in the logical AND function, and the size of the drive transistors connected to the state conductors.

In each pulse circuit, the onset of the pulse occurs when the last input to the AND function becomes TRUE, causing the output of the AND function to change. Ultimately, this change initiates the state transition because it activates one or more of the state conductor drive transistors, changing the state of the finite state machine as required. The AND logic output may activate the drive transistors directly, or indirectly through one or more inverters.

An important aspect of the present invention is that one or more of the state conductors changed by a pulse-generating circuit are themselves inputs to the AND function in that circuit. Shortly after the pulse generating circuit initiates the pulse, the selected drive transistor changes the state of the state conductor.

This, in turn, renders at least one input to the AND function FALSE, terminating the pulse. Thus, completion of the state transition initiated by the pulse generating circuit serves to terminate the pulse that initiated the state transition.

It is important to control carefully the time between onset and termination of the pulse. The pulse must last long enough to change reliably the state of all the state conductors that it drives. However, because there will be other, similar, pulse generating circuits elsewhere on the state conductor, the pulse must terminate promptly enough to avoid interfering with the actions of such other pulse circuits.

In the present invention, the duration of the pulse is set by the number of inverters associated with the logical AND function and the width of the transistors in the circuit. There is a logical feedback loop involving the AND function, the drive transistor, the state conductor, and the state conductor input to the AND function. The loop may also include extra inverters before or after the AND function as required. This logical feedback loop has a characteristic response time that depends on the number and width of the transistors involved in the loop.

Groups of pulse generating circuits used for the various transitions of a finite state machine will work best together if their characteristic action times are chosen to avoid mutual interference. Design of circuits built according to the present invention involves choosing the proper number of inverters to include in each such cycle of logical inversions and the width of the transistors throughout the loop.

Given a suitable choice of inverters and transistor sizes, finite state machines built using the present invention can operate at very high speeds. The fundamental reason for the high operating speeds is that the pulse generating circuits can have very little "logical effort" as described in a book entitled, "Logical Effort," by Ivan Sutherland, Bob Sproul and David Harris, Morgan Kaufmann Publishers, Inc., San Francisco , Calif., 1999. This low logical effort makes it possible to construct logical feedback loops as short as three logic inversions. Such loops give a characteristic cycle time approximately that of a ring oscillator composed of three inverters. Faster operation is difficult to imagine. Cycles of logical inversions with five or seven or any odd number of logical inversions are also possible. Such loops, while slower, are more tolerant of miscalculations in the size of transistors and of variations in manufacture. Note that in a three-inverter loop, the propagation speed around the loop is very fast, and voltage rise time in CMOS is relatively slow. Hence, it is hard to ensure that a voltage rise has completed before a three-inverter loop swings the voltage back down toward a low voltage level.

A major advantage of the present invention is its ability to combine the actions of several pulse circuits on a single state conductor. The state conductor can extend to the locations most convenient for the pulse circuits that drive it. Near each pulse circuit a suitable N-type or P-type drive transistor drives the state conductor to its new state. Thus, the pulse circuit's output signal need extend only a short distance from the pulse circuit to the drive transistor. Any of several pulse circuits is equally able to change the state of the state conductor via its own drive transistor. The pulse control logic itself ensures that the drive action for one state change terminates before the drive action for a subsequent state change begins. Of course, as in all finite state machine designs, the state change logic must avoid initiation of two conflicting state transitions at the same time.

Embodiments

This specification presents a number of embodiments for the AND function in accordance with the present invention. One form, shown in FIG. 1, uses a series stack of two or more N-type drive transistors connected directly to the state conductor. The AND function and the drive transistor operation are combined. Of course P-type drive transistors might also be used. When all such transistors conduct, they change the charge of the state conductor to make the chosen state transition. The state conductor itself serves as one input to the logical AND function, via inverters 104 and 106. Inverters 104 and 106 provide a short delay that, together with the time taken to charge or discharge the state conductor, sets the duration of the action pulse. The logic feedback loop comprised of inverters 104 and 106 and N-type drive transistor 108 involves three logical inversions, two in inverters 104 and 106, and one in N-type drive transistor 108 that is part of the stack of drive transistors. Of course, other numbers of logical inversions are possible. Note that the order of transistors 108 and 110 in FIG. 1 does not matter. In an alternative embodiment, the source of N-type transistor 108 can be coupled to ground, the drain of N-type transistor 110 can be coupled to state conductor 102, and the source of N-type transistor 110 can be coupled to the drain of N-type transistor 108.

Note that other state conditions signal 112 is coupled to the gate of a single N-type transistor 110. However, note that in general a number of N-type transistors can be coupled in series to perform an AND operation for a number of separate state conditions.

Figure 2:
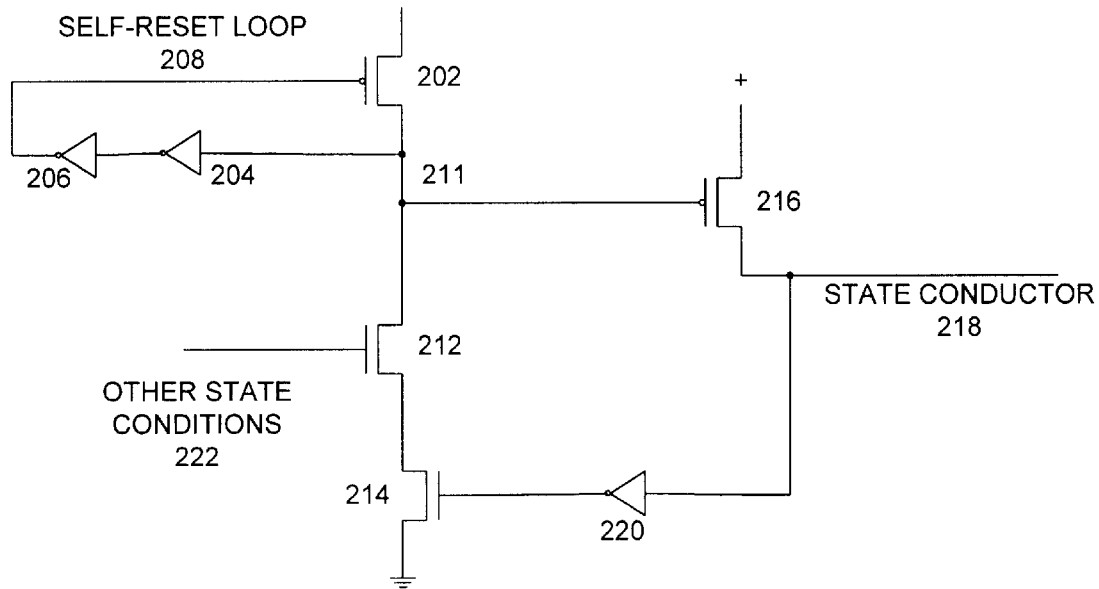
FIG. 2 illustrates an asynchronous circuit that holds state information on a conductor and includes a self-resetting NAND gate in accordance with another embodiment of the present invention.

A second form uses a self-resetting AND function. FIG. 2 illustrates this form with two series N-type transistors 212 and 214 but there might be more series transistors involved or P-type transistors might be used. When all transistors in this series stack 212 and 214 conduct, the node 211 to which they connect changes to the LO state. This node is also connected to the gate of the drive transistor 216, which drives state conductor 218 towards the HI state. A separate mechanism involving inverters 204 and 206 and the P-type reset transistor 202 form a "reset loop" that returns node 211 to the HI state, terminating the pulse and shutting off the drive transistor 216. In this circuit, the timing of the reset loop must be carefully controlled because it sets the duration of the action pulse. It must provide a long enough pulse to the drive transistor 216 to properly change the state of state conductor 218, and must shut off drive transistor 216 soon enough so as not to interfere with the next action of state conductor 218. (Note that in this specification and in the following claims the term "NAND gate" can refer to both self-resetting and non-self-resetting NAND gates.)

Also note that the order of transistors 214 and 212 in FIG. 2 does not matter. In an alternative embodiment, the source of N-type transistor 212 can be coupled to ground, the drain of N-type transistor 214 can be coupled to node 211, and the source of N-type transistor 214 can be coupled to the drain of N-type transistor 212.

One advantage of this self-resetting circuit is that a single such NAND function can serve several drive transistors. This permits a single pulse-generating circuit to change the state of several state conductors. At least one of the state conductors so driven is connected to one of the transistors in the series stack that does the AND logic function so that the desired action, namely changing the state of the state conductor, turns off the series stack. This turn off action prevents the series stack from interfering with the reset action of the reset loop and the reset transistor 202.

Figure 3:
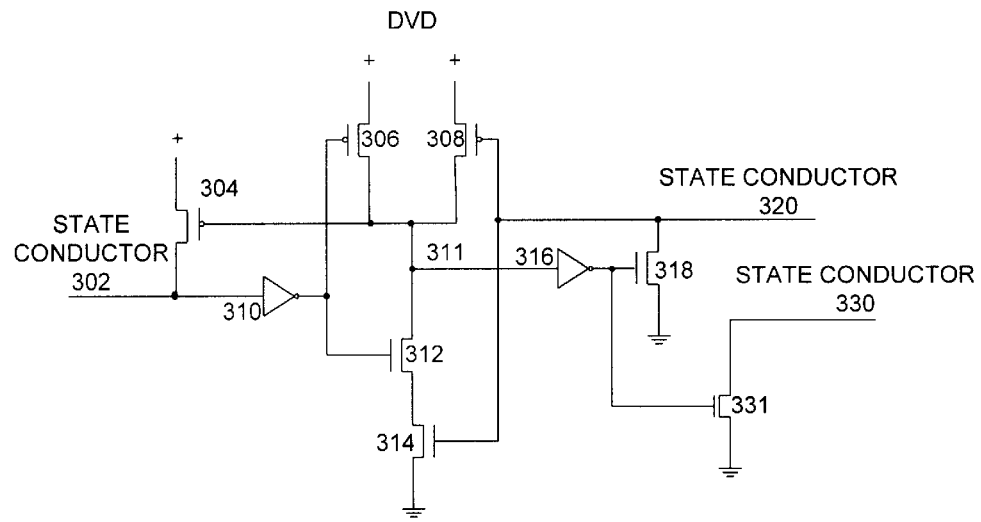
FIG. 3 illustrates an asynchronous circuit that controls two conductors in accordance with an embodiment of the present invention.

A third form uses the more common form of NAND circuit often used in other CMOS logic circuits. This form is illustrated in FIG. 3. The NAND circuit consists of the series N-type transistors 312 and 314 and the parallel P-type transistors 306 and 308. Of course, with a suitable change in the voltage levels that represent TRUE and FALSE, the N-type and P-type can be interchanged if desired, creating what is commonly known as a NOR logic gate. In this circuit, the series transistors in the NAND gate initiate the pulse. When all of them conduct, the internal node 311 of the circuit becomes LO which, in turn, drives one or more state conductors 302 and 320. FIG. 3 illustrates three state conductors 302, 320 and 330, all of which are driven in response to the output of the NAND logic gate. State conductor 302 is driven HI by drive transistor 304; state conductor 320 is driven LO by drive transistor 318; and state conductor 330 is driven LO by drive transistor 331l. Note that state conductor 330 is not part of the feedback loop through the NAND circuit.

Although the circuit of FIG. 3 illustrates the NAND controlling three state conductors 302, 330 and 330, it could equally well control more or fewer state conductors by including separate drive transistors for each such conductor. Likewise, the circuit of FIG. 2 can also accommodate additional state conductors by including for each a separate drive transistor like 216. To accommodate additional state conductors with the circuit of FIG. 1, we just duplicate the entire circuit for each such conductor.

In the circuit of FIG. 3 there are two logic feedback loops that share the NAND gate. Both of these involve state conductors whose state will change in response to the action of the pulse. Note that state conductor 302 will go HI as a result of the pulse slightly before state conductor 320 goes LO, because the drive transistor 304 for state conductor 302 precedes inverter 310 in its logic feedback loop, whereas the drive transistor 318 for state conductor 320 follows the inverter 316 in its logic feedback loop. However, in a circuit with well-chosen transistor sizes, the two inputs to the NAND gate will both go FALSE nearly simultaneously.

This simultaneous return to FALSE of both inputs of the NAND gate warrants extra consideration. In the usual form of a NAND gate, the widths of the two P-type transistors 306 and 308 are chosen so that either of them can return the output to the HI state alone. In this application, both will always act together, and so their widths can be chosen to make their combined action act in the desired time. This usually results in the widths of these transistors being less than would normally be considered proper.

Loops With More Inverters

In each of the circuits of FIGS. 1, 2 and 3 we see logic feedback loops involving three logical inversion functions. Ideally, each such feedback loop should act with very nearly the same delay. The reason for wishing to match these delays may be understood with reference to FIG. 4A.

Figure 4A:
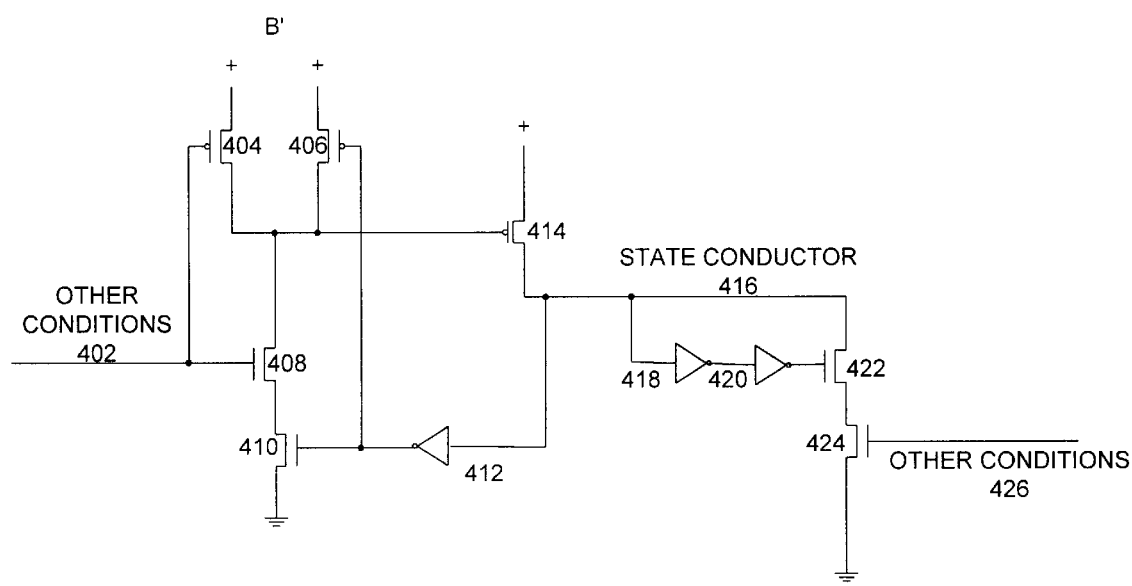
FIG. 4A illustrates another asynchronous circuit that holds state information on a conductor in accordance with an embodiment of the present invention.

In FIG. 4A a first pulse circuit on the left and a second pulse circuit on the right together control the state of the state conductor 416. The first pulse circuit is shown as a NAND type, but any type might have been used. Similarly, the second pulse circuit uses the drive transistors themselves to do the NAND function, but again any of the types might be employed.

When the "other conditions" 402 at the left is HI and the state conductor 416 is LO, the pulse circuit on the left will act. This pulse will drive state conductor 416 HI via drive transistor 414, and will promptly shut off drive transistor 414 after three gate delays. If the "other conditions" input 426 on the right is also HI, the pulse circuit on the right will immediately drive state conductor 416 LO again via drive transistor 422 and again immediately shut off drive transistor 422 after three gate delays. Thus, if both "other condition" inputs 402 and 426 remain TRUE, the circuit of FIGS. 4A and 4B will oscillate, just as would a three inverter ring oscillator.

Figure 4B:
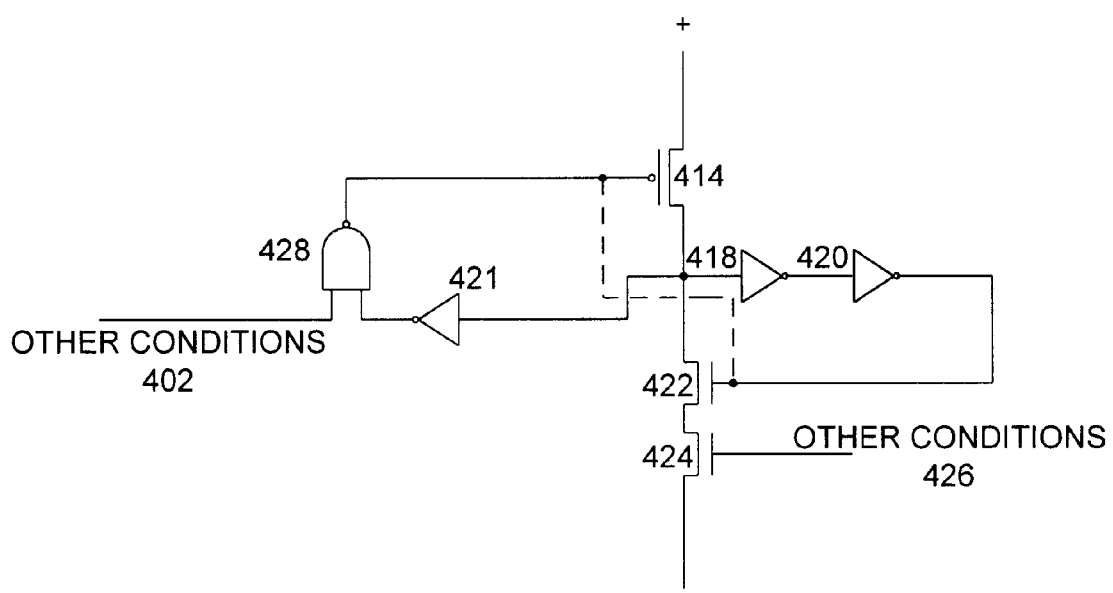
FIG. 4B presents another representation of the circuit illustrated in FIG. 4A in accordance with an embodiment of the present invention.

FIG. 4B shows the equivalent circuit of this arrangement. The inverters 418 and 421 produce outputs nearly identical. The NAND gate 428 acts as an inverter also, producing an output that is nearly identical to the output of inverter 420. Thus, we can see that the inputs to transistors 414 and 422 are nearly identical.

Because the inputs to transistors 414 and 422 are nearly identical, we might as well have connected them together as shown by the dotted line, thus converting transistors 414 and 422 into an inverter also. The result is a ring logically composed of three inversion functions. Such rings are known to oscillate very quickly.

One might think that such oscillations are bad. Not so, for FIGS. 4A and 4B represent a finite state that follows two simple rules. First, when state conductor 416 is LO and the other conditions 402 are TRUE, make the state conductor 416 HI. Second, when state conductor 416 is HI and the other conditions 426 are TRUE, make the state conductor 416 LO. If all input conditions 402 and 426 are TRUE, as we supposed in constructing FIG. 4B, the system will oscillate at its maximum possible rate, making state conductor 416 alternately HI and LO. Should any of the other conditions 402 and 426 cease to be TRUE, the oscillations will cease.

In more complex systems, as we shall shortly see, these pulse circuits fit together in ways that form complex oscillatory loops, loops coupled by the AND functions of the various pulse generating circuits. It is the coupling of those loops that produces the interesting behavior of coupled finite state machines that make these pulse circuits useful.

It must be recognized that the illustrations used here have used N-type and P-type transistors and HI and LO signals in a particular way. As those familiar with the art will immediately see, one can easily substitute P-type for N-type transistors throughout with a suitable inversion of the meanings of HI and LO voltage levels.

Sample Applications

Figure 5:
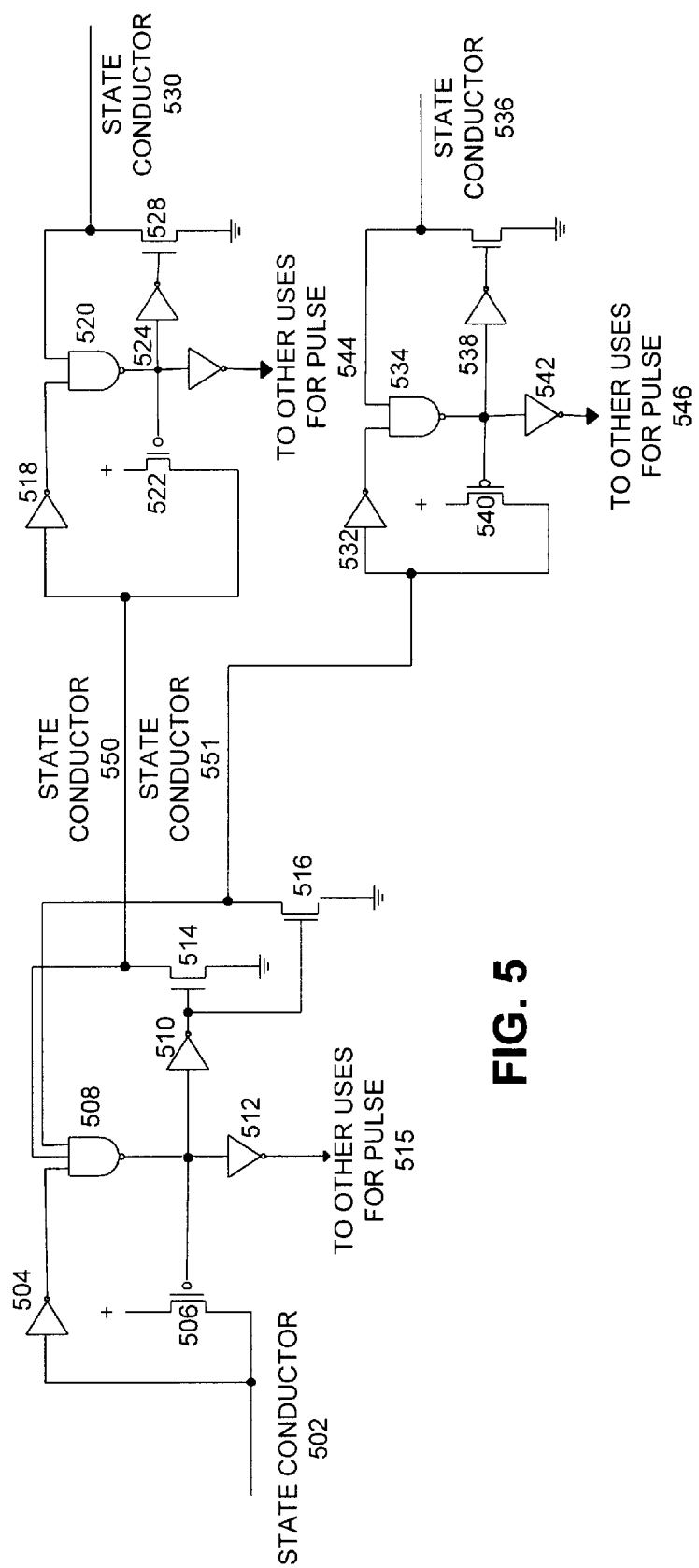
FIG. 5 illustrates an asynchronous circuit that controls a short first-in-first-out (FIFO) circuit that branches in accordance with an embodiment of the present invention.

One application of these pulse circuits is for control of an asynchronous first in first out register system or FIFO. This application is illustrated in FIG. 5, which shows five state conductors and three pulse generating circuits. Each state conductor represents the state of a separate FIFO stage, where a FIFO stage can be in one of two states: EMPTY or FULL. The pulse generating circuits each act when the state conductor on their left is LO and the state conductor on their right is HI, or if there is more than one state conductor to the right, when all such state conductors are HI. If we assign the meaning "stage is FULL" to a LO state conductor and the meaning "stage is EMPTY" to a HI state conductor, this circuit forms the proper control for a short FIFO that branches from one input at the left to two outputs at the right. Repeating elements from this circuit in longer chains will form FIFO controls of any length; of course the branching feature may be omitted if desired, it's shown here for illustrative purposes.

Recall that each pulse circuit responds when its left input is LO, i.e. the stage to its left is "FULL" and its right input is HI, i.e. the stage (or stages) to its right are "EMPTY." When the pulse circuit acts, it renders the stage on its left "EMPTY" and that on its right "FULL." Thus, the combination of FULL-EMPTY becomes the combination EMPTY-FULL. This transition condition is easily recognizable as the action required to control an asynchronous FIFO. When repeated in a chain, such circuits properly execute the required control for a FIFO.

The left pulse circuit uses a three-input NAND gate 508 to accommodate the three state conductors it uses for input. It drives both state conductors to its right via the two drive transistors 514 and 516.

Moreover, the pulses from the pulse circuit can serve other uses. One such use is to condition the pass gates in latches that carry data through the FIFO. Each output labeled "to other uses for pulse" 515, 544, and 546 produces a positive pulse for each action of the corresponding pulse circuit in the FIFO control. These positive pulses are exactly what are needed to condition latches, not shown, to move data through the FIFO.

There are several things to notice about this circuit. First, we can count four inverting logic functions from the output of one NAND circuit to the output of the next NAND to its right. For example, starting at the output of the three-input NAND 508, we count inverter 510, drive transistor 514, inverter 518, and NAND 520 as the four. Similarly, counting from the output of one NAND to the output of the NAND to its left we count only two inverting logic elements. For example, starting with NAND 520 we find P-type drive transistor 522 followed by NAND 508.

These counts of four and two represent the forward and reverse latency delays of the FIFO shown. We choose to make the longer latency in the forward direction to provide adequate time for the data latches, not shown, to propagate the data values. The two gate delays of the reverse latency are as fast as possible because data generally does not have to move in that direction.

Anyone familiar with the art will quickly recognize that these circuits will work effectively with additional inverters inserted in the pulse circuits shown. Thus, one can construct FIFO control systems, for example, that have forward latency of six or eight or more gate delays and reverse latencies of four, six or eight or more gate delays. All such systems without limitation are included as special cases of the present invention.

Symbols

Figure 6:
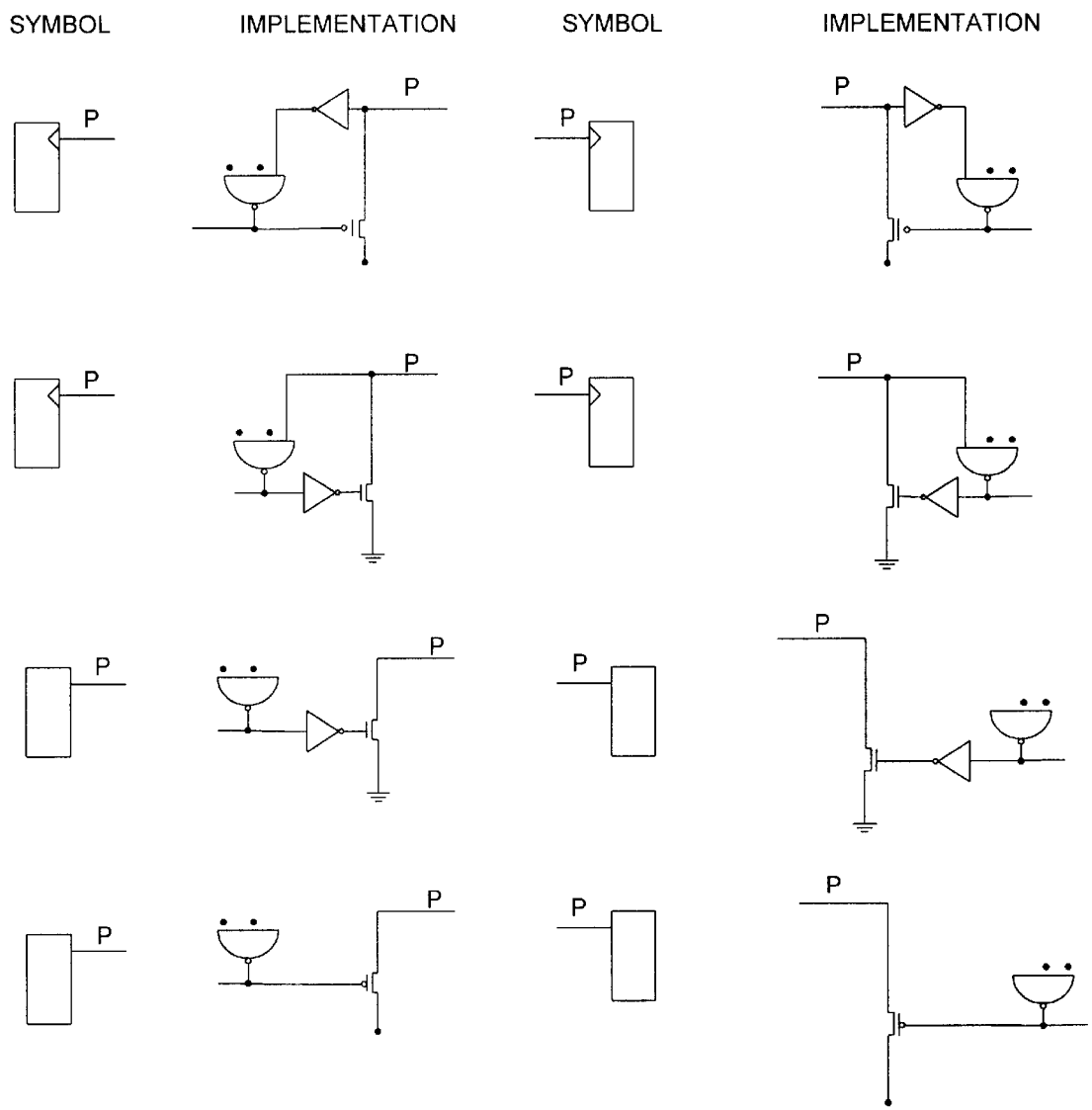
FIG. 6 illustrates several symbols and their corresponding circuits in accordance with an embodiment of the present invention.

FIG. 6 shows several symbols and their corresponding circuits, all of which will be recognized as members of the family already described. Of course, such symbols could also represent circuits with a larger number of inverters as described above.

Although not shown in the previous figures, each of the state conductors may have a small keeper attached. Such a keeper is just a pair of small back to back inverters that holds the state when no drive transistor acts to change it. Also not shown in the figure are separate drive transistors, often very small, that precondition the state of each state conductor to the proper initial state during system initialization.

Each of these symbols represents the circuit associated with one state conductor. The symbols of FIG. 6 show various connections between the state conductor and the AND function central to the pulse circuit. In each case, the pulse circuit is represented by the box; the state conductors by lines connecting one box to another. Each such state conductor may carry a label such as "P" as shown in FIG. 6, or identifying numbers, like 722 in FIG. 7A for example. Each box represents a pulse circuit with multiple state conductors.

In the representation of each pulse circuit, a NAND gate with one real input has several dots indicating zero or more additional inputs. In a particular symbol with many state conductors, each provides a separate input to this NAND gate or output from the NAND gate.

Where the state conductor connects to the pulse circuit with an arrowhead, as seen in the upper two rows, the state conductor serves as an input to the NAND gate. Where the state conductor connects to the pulse circuit without an arrowhead, the pulse circuit drives the state conductor, but without sensing the state conductor's state, as in the lower two rows of FIG. 6.

A complete pulse circuit may connect to many state conductors, some with arrowheads and some without. Its AND function fires only when the state of the state conductors with arrowheads hold appropriate states. The AND function is insensitive to the states of state conductors drawn without arrowheads.

We make arrowheads dark or light according to the following convention involving how the state of the state conductor is initialized. A dark arrowhead indicates that just after initialization the state of that state conductor is such as to permit the AND function to fire. A light arrowhead indicates that just after initialization the state of that state conductor is such as to prevent the AND function from firing. The pulse circuit will fire when each state conductor associated with a light arrowhead has changed state an odd number of times since initialization and each dark arrowhead has changed state an even number of times since initialization.

One can think of this firing as if the pulse circuit upon firing, changes all dark arrowheads to light in the firing pulse circuit, and vice versa for all arrowheads of pulse circuits to which the state conductors are connected.

Alternator

Figure 7A:
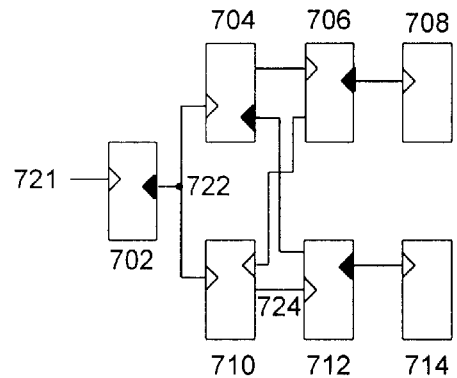
FIG. 7A illustrates an alternator circuit in accordance with an embodiment of the present invention.
Figure 7B:
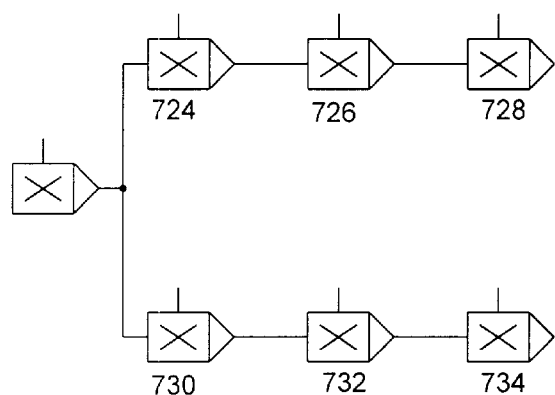
FIG. 7B illustrates registers associated with the alternator circuit in FIG. 7A in accordance with an embodiment of the present invention.

The configuration shown in FIGS. 7A and 7B represent an "alternator". The lines in this drawing represent state conductors, the boxes represent pulse circuits.

The state conductor 721 at the very left of the drawing initiates the action. When state conductor 721 indicates FULL, the pulse circuit 702 fires, rendering state conductor 721 EMPTY and state conductor 722 FULL. Now pulse circuit 704 can fire because it has two dark arrowheads, whereas pulse circuit 710 cannot fire because it has one light arrowhead. The firing of pulse circuit 704 renders state conductor 722 EMPTY and state conductor 724 FULL and permits pulse circuit 706 to fire. The next time state conductor 722 indicates FULL, the sequence will involve the lower row of pulse circuits rather than the upper row, and so the action proceeds, alternately delivering control signals via pulse circuit 704 and pulse circuit 710.

FIG. 7B shows a data path suitable for use with the control configuration of FIG. 7A. Each box with an X represents a pass gate and the following triangle represents a "sticky buffer". Thus, each of the symbols represents a data latch or multiple data latches suitable for holding a parallel data "word" of many bits. The control signals for these latches come from the corresponding pulse circuits in FIG. 7A following the form of FIG. 5, "to other uses for pulse". Through the actions of the pulse outputs of the control circuit of FIG. 7B, data will move through this data path alternately on the upper and lower arms.

Round Robin

Figure 8:
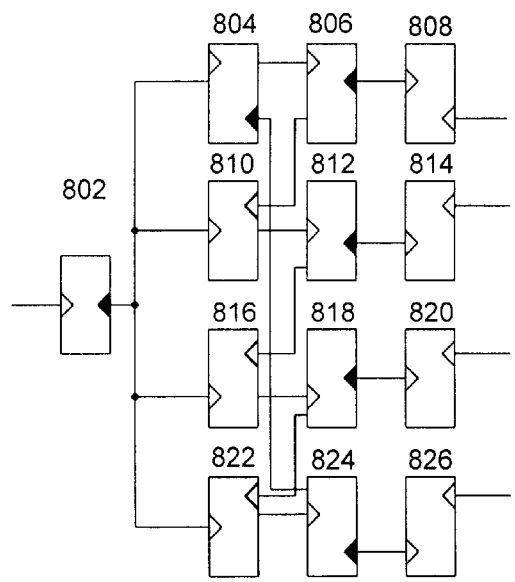
FIG. 8 illustrates a round robin circuit in accordance with an embodiment of the present invention.

A similar circuit can deliver information sequentially to any number of outputs. The control circuit of FIG. 8 shows how. Here the sequence of operation involves pulse circuits in the sequence 804, 810, 816, 822, 804, 810, . . . .

It is important to note that the diagrams of FIGS. 7 and 8 are really circuit diagrams. The lines represent state conductors. The boxes represent the pulse circuits that control the transitions between states. The ability to change the state of a state conductor from anywhere along its length makes the diagrams meaningful because each pulse circuit block has access both to the state of the state conductor and the ability to change that state. The pulse circuits terminate their actions quickly enough so as not to interfere with each other given logically correct designs.

In the FIGS. 7A, 7B and 8, some pulse circuits are connected via two parallel state conductors and some by only a single state conductor. Where there is a single state conductor with arrowheads on both ends, both pulse circuits examine its state, and when one fires, it changes the state of the state conductor to permit the other to fire. Where a state conductor connects one pulse circuit to another with an arrowhead only at one end, the pulse circuits thus connected will fire in the sequence indicated by the arrowheads. For example, in FIG. 7A the pulse circuits 704, 706, 710, and 712 must fire in that sequence. The light colored arrowhead at the right of 710 indicates that it cannot fire until after 706 has fired.

Data Conditional Branch

If one of the inputs to its logical AND function involves a bit of data carried in a FIFO, the pulse circuit will operate only when that data bit carries a particular value. This behavior makes possible the data conditional branch circuit shown in FIG. 9. In this circuit the logical AND function is split into two parts to obtain a total of three inputs. The first part comprises the two-input NAND gate 908, and the second part is the series stack of two N-type drive transistors 910 and 912 that can drive state conductor 924 to the LO state. The left input to NAND gate 908 indicates the state of state conductor 902, which makes NAND gate 908 responsive only when state conductor 902 is LO, indicating FULL. The right input to NAND gate 908 is state conductor 924, which makes NAND gate 908 responsive only when state conductor 908 is HI indicating EMPTY. The third input to the AND function is the "data in" signal delivered to the lower of the two N-type transistors 910 and 912 in the series drive stack.

The two parts of the logical AND function act somewhat separately. The NAND gate 908 produces a pulse whenever the two state conductors 902 and 924 indicate the FULL-EMPTY condition. Its action always returns state conductor 902 to the EMPTY state via P-type drive transistor 906. The second part of the logical AND function, namely the stack of two N-type transistors 910 and 912 acts only when the state condition is FULL-EMPTY and the data input value is also TRUE. Thus, state conductor 924 will be set to the FULL state only when a TRUE data input is present. If the data input 918 indicates FALSE, state conductor 924 will remain in the EMPTY state. Thus, the value of data input 918 determines whether or not this value is propagated further along the pipeline.

The timing of this circuit deserves some consideration. Notice that the two nodes labeled 930 and 932 are driven by inverters 916 and 914 with common inputs. Thus, for properly chosen transistor sizes, the signals on these two nodes 930 and 932 will be virtually identical. The data input signal from the previous stage of the FIFO pipeline will be valid in time for the latch to capture in response to the rising edge of signal 930. Thus it follows that the rising edge of 932 will also find that data value valid at the stack of two N-type transistors 910 and 912. Thus, the action of the circuit is always to capture the input value in the latch, whether the value is TRUE of FALSE, but to pass on the control signal to the right state conductor only for TRUE input data.

Figure 9:
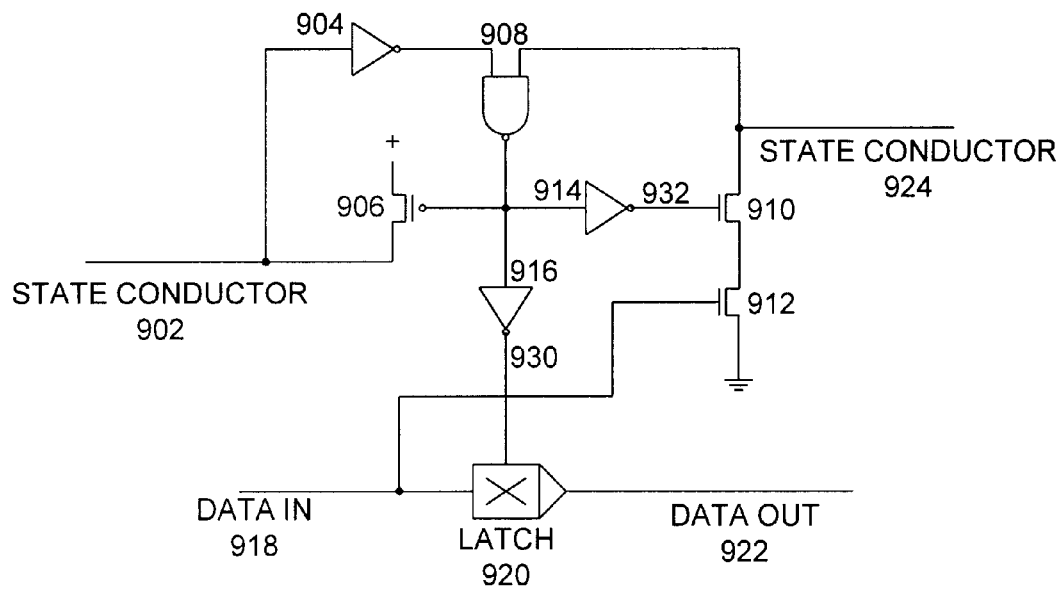
FIG. 9 illustrates a data conditional circuit using a NAND gate form in accordance with an embodiment of the present invention.
Figure 10:
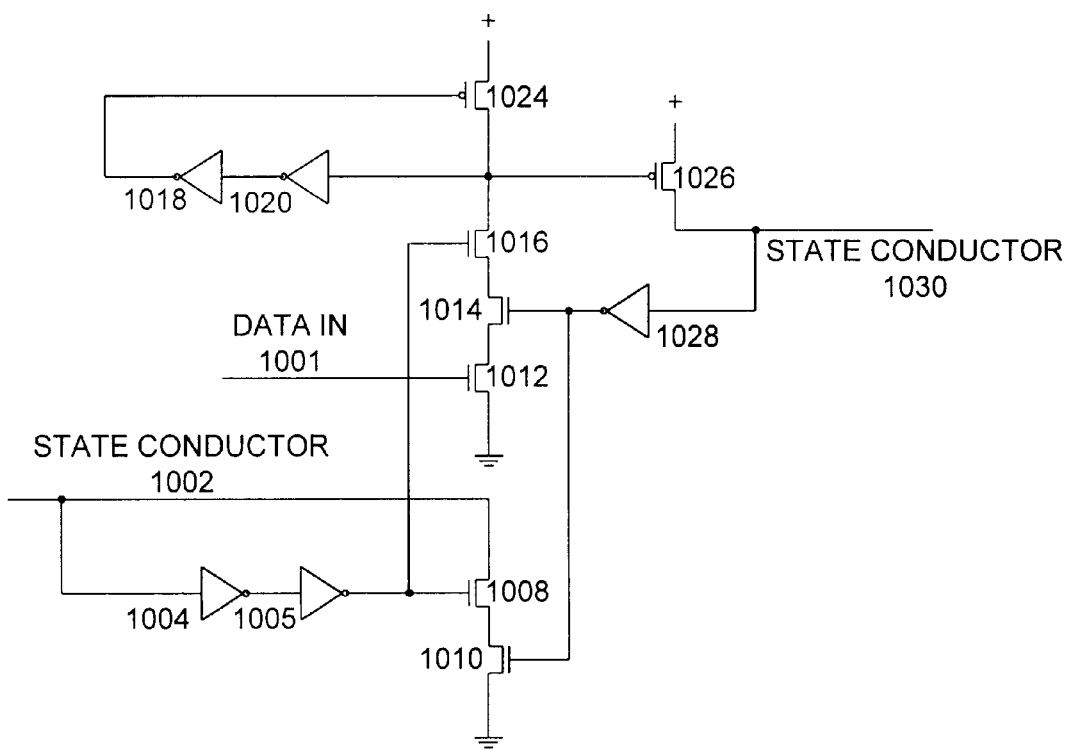
FIG. 10 illustrates a data conditional circuit using a self-resetting form in accordance with an embodiment of the present invention.

Whereas FIG. 9 shows a data conditional circuit using the NAND gate form of circuit, FIG. 10 shows a similar data conditional circuit using the self-resetting form of circuit. Here again the logical AND function appears in two parts. The first part is the series stack of two N-type transistors 1008 and 1010. It is connected to the left state conductor 1002 and upon acting will change its state to EMPTY. The second part of the logical AND function is the series stack of three N-type transistors 1012, 1014 and 1016. It is connected to the right state conductor 1030 via P-type drive transistor 1026 and upon acting will change the state of the right state conductor 1030 to FULL.

It is easy to see that when the states of state conductors 1002 and 1030 are FLAIL and EMPTY respectively, one or both of the logical AND functions will act. If the data input 1001 is TRUE, both logical AND circuits will act together, changing the state conductors 1002 and 1030 to the EMPTY-FULL state. If, however, the data input is FALSE, only the two-input series stack 1008 and 1010 can act, and the state is set to EMPTY-EMPTY respectively.

Data Condition Branching and Merging

Figure 20:
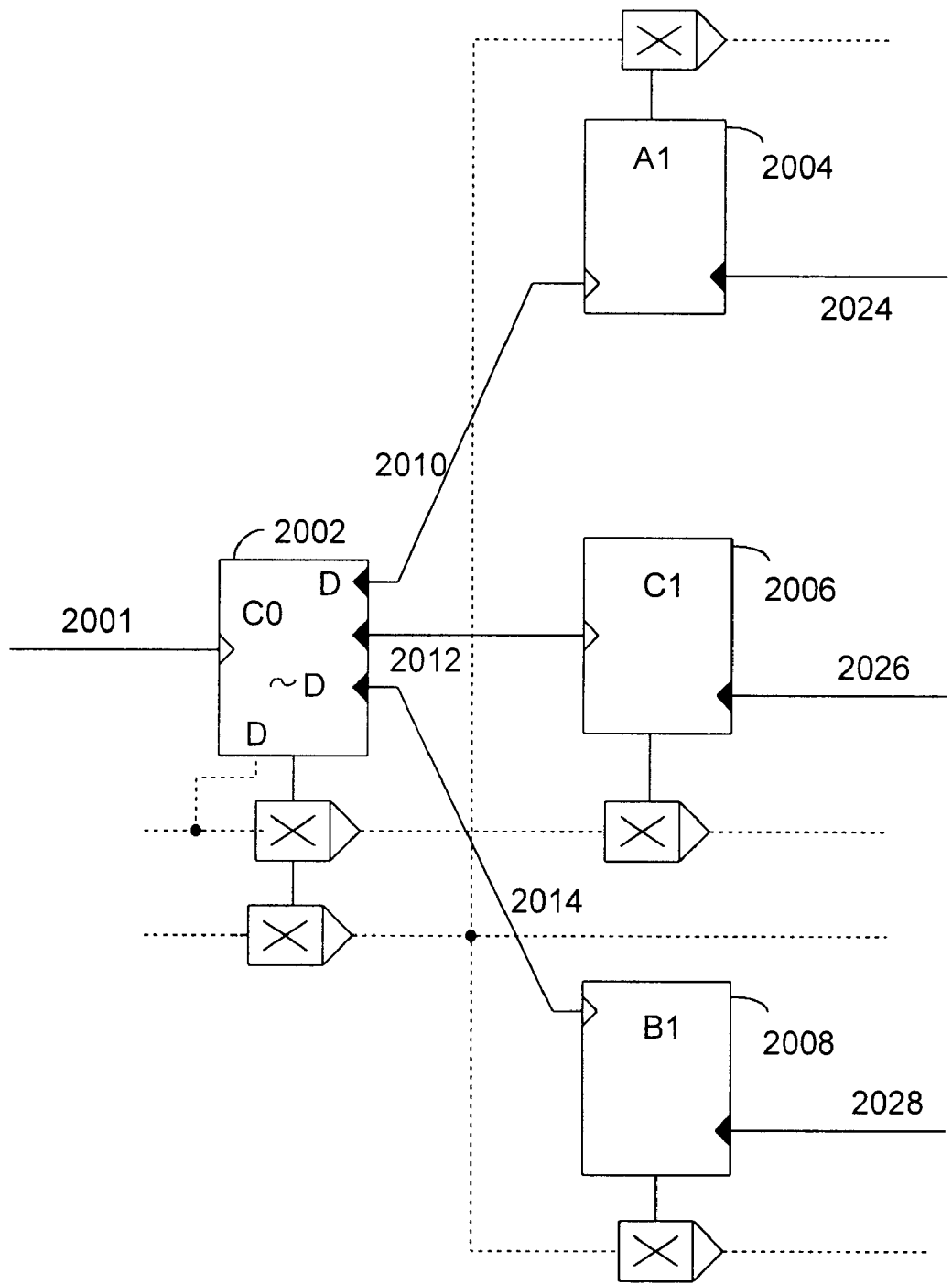
FIG. 20 illustrates a conditional branch circuit in accordance with an embodiment of the present invention.

FIG. 20 illustrates a branching section that includes two concurrent FIFO stages: a data-dependent branching stage and a simple FIFO stage. The simple FIFO stage formed by pulse circuits 2002 and 2006 propagates the data bit "D" that determines whether to branch to either A1 2004 or B1 2008. Note that this FIFO is referred to as the "order" FIFO.

In FIG. 20, four pulse devices 2002, 2004, 2006, and 2008 form a conditional branch circuit. Pulse circuit 2002 receives a data bit D from the data path (dotted lines). Its action depends on the value of that data bit. The general idea is that when the data bit is TRUE, the data values will pass to the upper output via pulse circuit 2004, and when the data bit is FALSE the data values will pass to the lower output via pulse circuit 2008. In both cases, the data bit passes on via the central pulse circuit 2006.

Pulse circuit 2002 can fire only when its left state conductor 2001 indicates FULL, i.e . . . , that data are available at the left input to the circuit and all three of its right state conductors, 2010, 2012, and 2014 indicate EMPTY. Upon firing, the data bit D conditions the drive of the two output state conductors 2010 and 2014. If D is TRUE, state conductor 2010 changes state. If D is FALSE, state conductor 2014 changes state. In either case, state conductor 2012 changes state.

Figure 21:
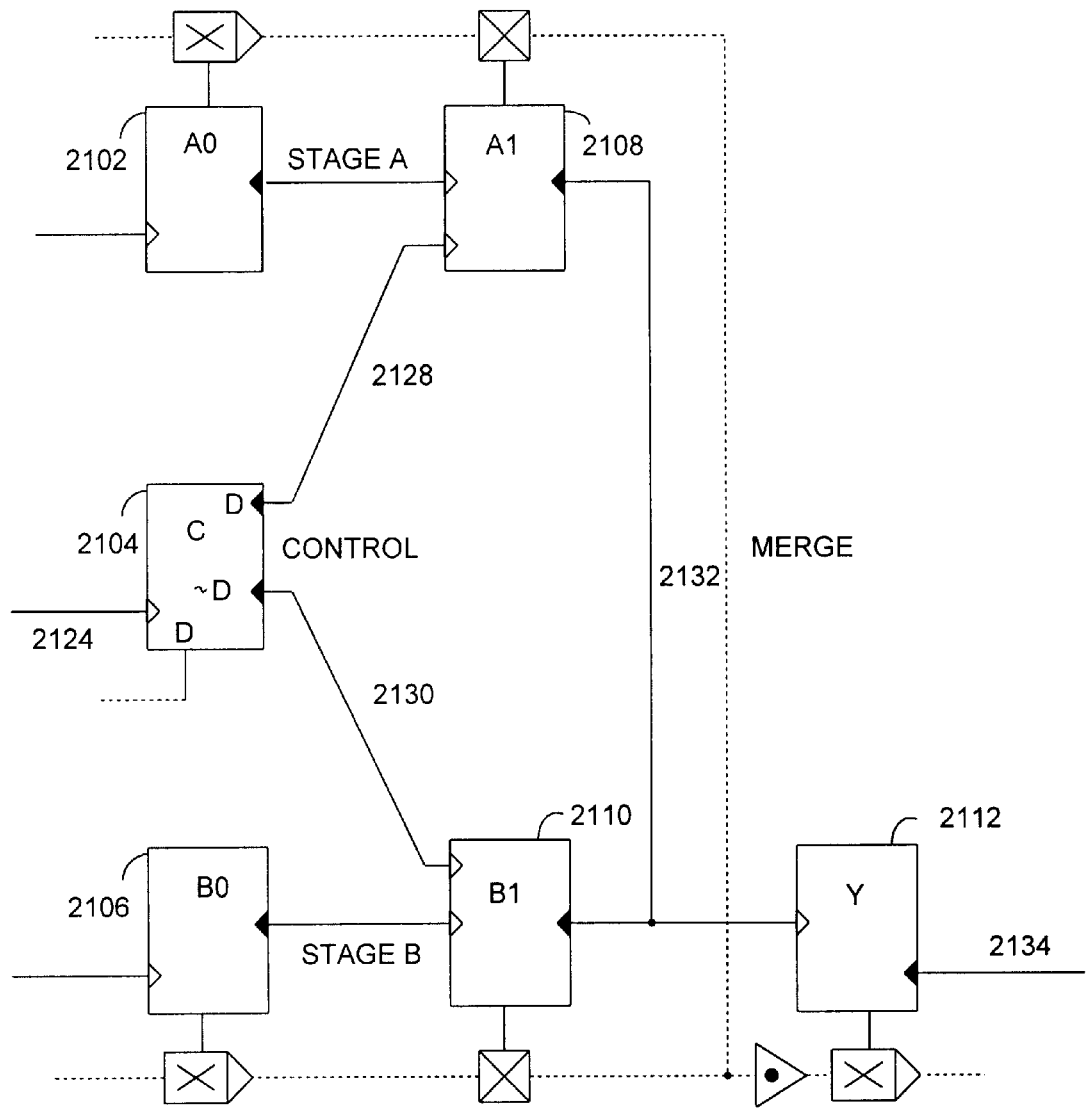
FIG. 21 illustrates a conditional merge circuit in accordance with an embodiment of the present invention.

FIG. 21 presents an implementation of merging stages that includes four concurrent pipeline stages: the last stage of pipeline A, called Stage A; the last stage of pipeline B, called Stage B; a stage that merges pipeline A and pipeline B, called Merge; and a stage called Control that determines which pipeline to retrieve the next data item from based upon the data value "D".

In FIG. 21, six pulse circuits act together to form a data dependent merge. Upon receiving an indication that data are available at its input, as signified by a change of state on state conductor 2124 to the FULL state, and space available at its output, pulse circuit 2104 fires. Depending on the value of the data bit D, it changes the state of either state conductor 2128 or state conductor 2130.

Pulse circuits A1 and B1 (2108 and 2110 respectively) can fire only when three conditions all exist, as indicated by the three arrows in each. For example, pulse circuit 2108 will fire when the state conductor STAGE A indicates FULL, when the Control has chosen it, and when state conductor 2130 indicates that space is available (EMPTY).

Because pulse circuit 2104 will set only one of its two output state conductors 2128 and 2130, only one of the two pulse circuits 2108 and 2110 can fire at a time. The one which fires determines whether data are taken from the upper channel, stage A, or from the lower channel, stage B. In either case, state conductor 2132 is set to the state indicating FULL, enabling pulse circuit 2112 to pass the selected data forward.

Demand Merge (Arbitration)

One important problem in asynchronous systems is to provide service "on demand." The problem is rendered particularly difficult in asynchronous systems because any event may occur at any time, and thus two conflicting demands for service may occur very nearly simultaneously. It is well known in the art that an "arbiter" or "mutual exclusion element" can be used to resolve such conflicts.

Figure 11:
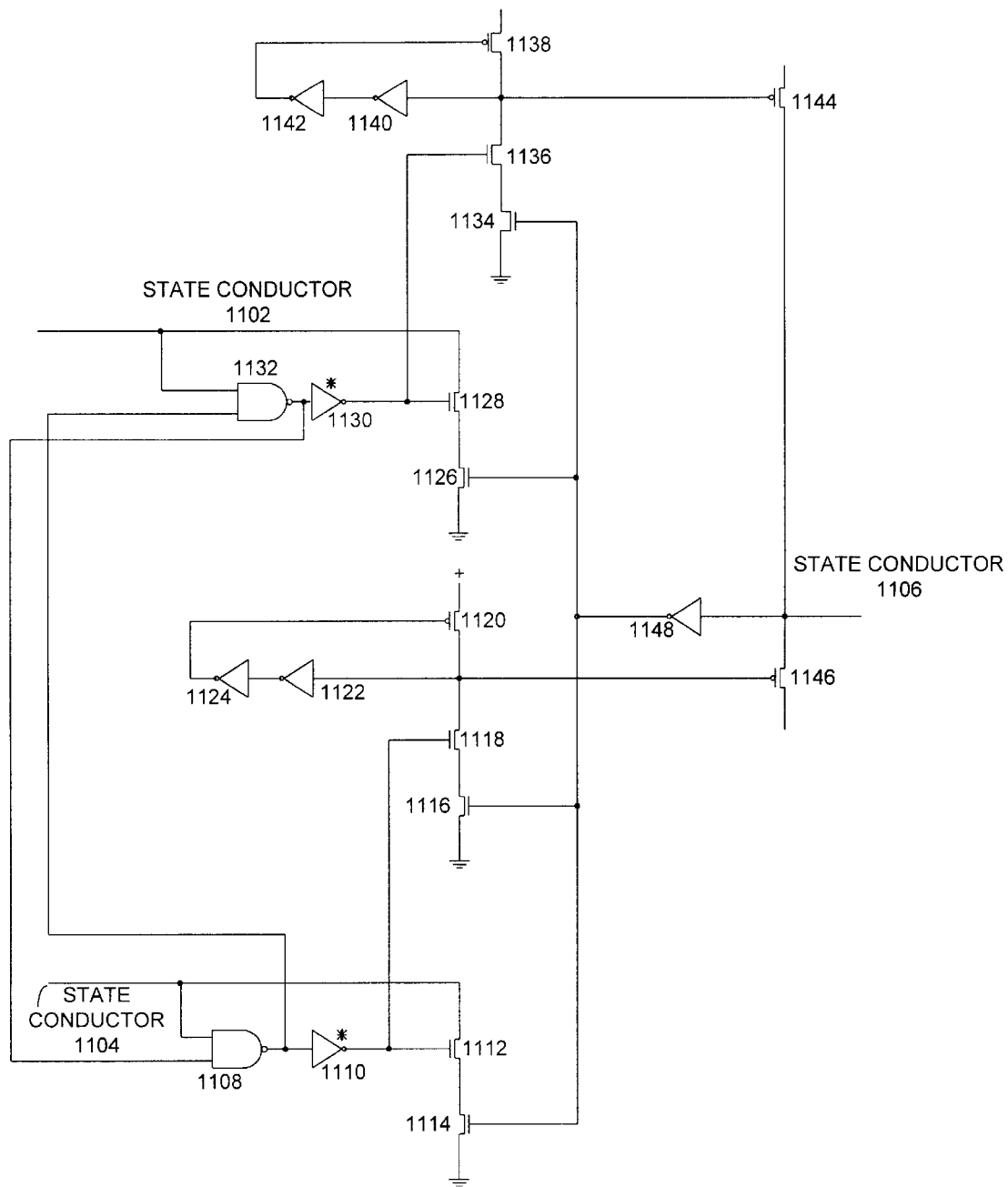
FIG. 11 illustrates a demand merge circuit in accordance with an embodiment of the present invention.

The circuit of FIG. 11 has two state conductors labeled 1102 and 1104 on the left. These are intended as inputs. The single state conductor 1106 on the right is an output that will serve either input on demand. There are also four stacks of two N-type transistors each (1134 and 1136, 1126 and 1128, 1116 and 1118, and 1114 and 1112), connected into two pairs because their inputs are connected in parallel.

At the left of the drawing are two NAND gates 1132 and 1108 that are cross-coupled to form a mutual exclusion element. If both inputs to one of these NAND gates are HI, its output will be driven LO and thus ensure that both inputs to the other NAND gate cannot both be HI. Thus, at any one time, one and only one of the outputs of these two NAND gates 1132 and 1108 can be LO. That, however, is not the whole story.

Should both state conductor 1102 and state conductor 1104 become HI at the very same time, as might happen during simultaneous requests for service, the pair of NAND gates 1132 and 1108 may reach a balanced state in which their outputs lie at some intermediate voltage between HI and LO. Such "metastable" states are recognized by those skilled in the art. After a time the metastable state gives way to a state in which one output is HI and the other LO. How long it takes to exit from metastability depends on how closely in time the two inputs arrive and thus how nearly balanced is the initial metastable state of the two NAND gates.

It is well known in the art that one can detect the exit from metastability. In the circuit of FIG. 11 the two inverters marked with a star 1130 and 1110 are specially designed to produce a LO output unless their input is clearly LO rather than merely metastable. Thus a HI output from the star inverters assures us that metastability is over. One and only one of the star inverters will produce a HI output.

The logic of this circuit establishes the following logical AND condition for action by the upper and lower logical AND functions. The upper function will act if state conductor 1102 is HI and state conductor 1106 is LO and the lower function is guaranteed not to act. The guarantee can come either because state conductor 1104 is LO, or because the mutual exclusion element 1132 and 1108 has chosen otherwise. Similarly, the lower AND function can act if state conductor 1104 is HI and state conductor 1106 is LO and the upper function is guaranteed not to act.

Action by either the upper or lower half circuits accomplishes two things. First, it sets conductor 1106 to HI via P-type drive transistors 1144 or 1146 as the case may be. Second, it sets the chosen left state conductor 1102 or 1104 to LO via the series stack N-type drive transistors 1126 and 1128 or 1114 and 1112 as the case may be. This combination of actions is called "servicing the request."

Example FIFO Operation

FIGS. 12–19 illustrate the operation of a three-stage first-in-first-out (FIFO) register control circuit.

Figure 12:
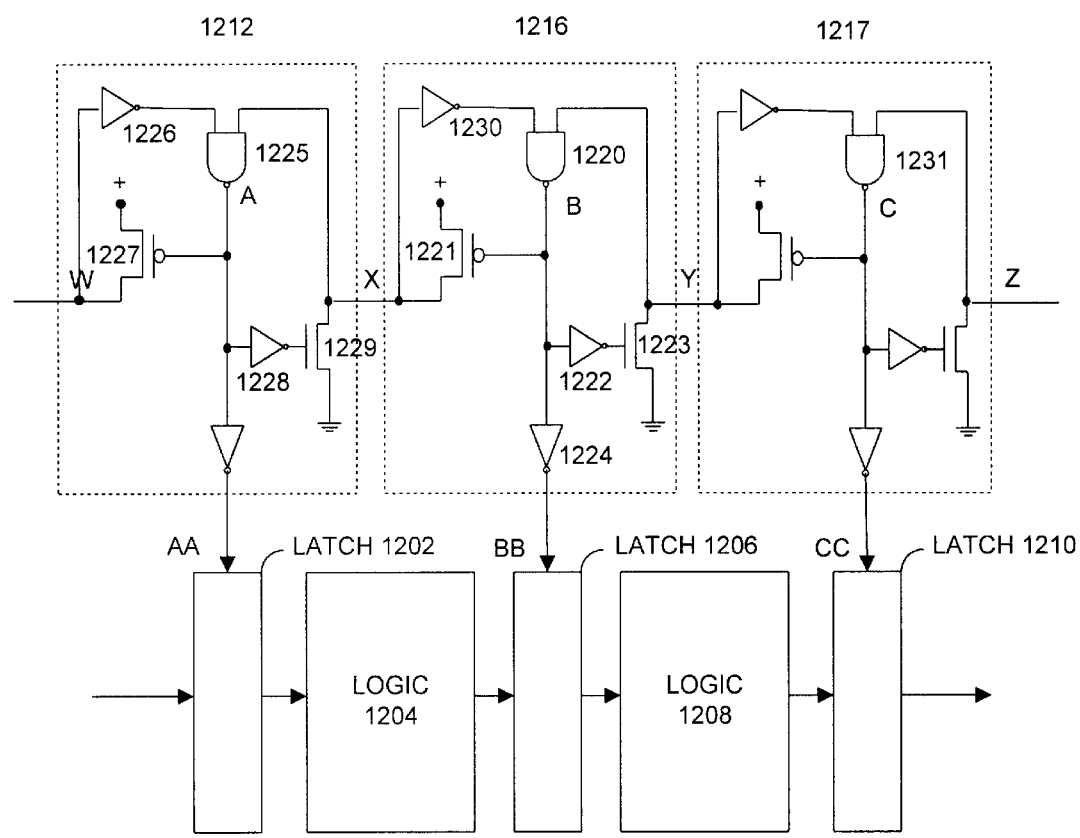
FIG. 12 illustrates a low is full form of a FIFO circuit in accordance with an embodiment of the present invention.
Figure 16:
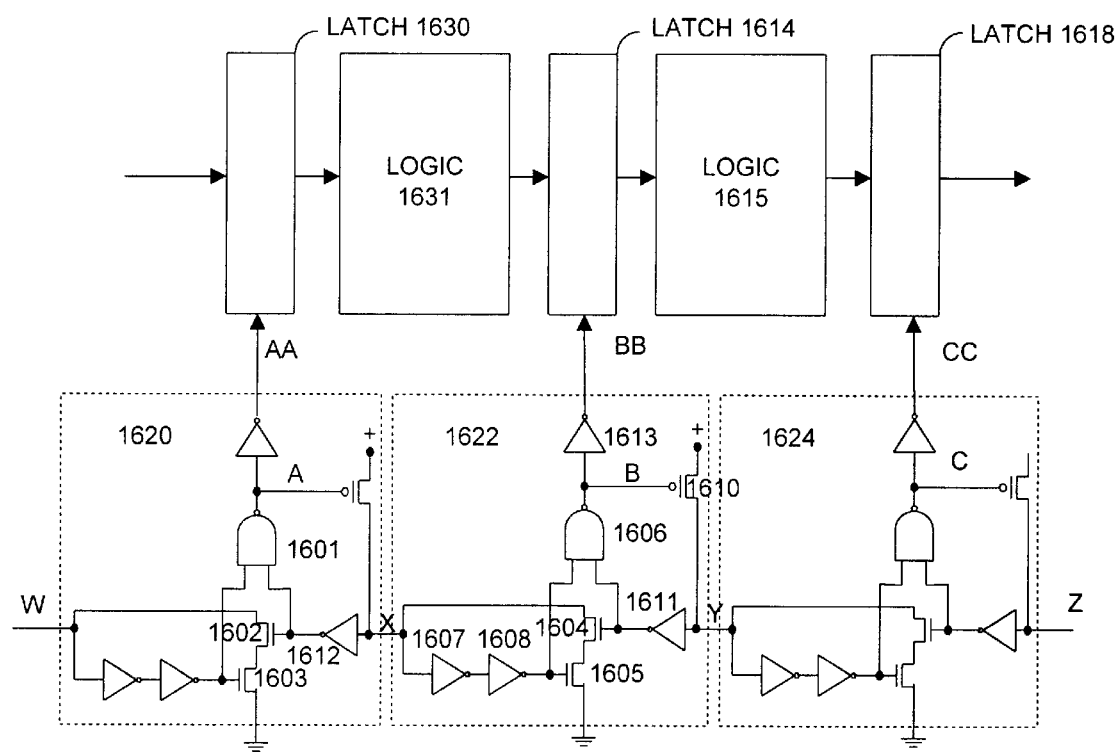
FIG. 16 illustrates a high is full form of a FIFO circuit in accordance with an embodiment of the present invention.

In FIGS. 12 and 16 there are four state conductors labeled W, X, Y, and Z. The NAND gate outputs carry labels A, B and C. Amplified pulses suitable for operating the latches of a data path are labeled AA, BB, and CC.

LO is Full Circuit

The "LO is full" circuit form appears in FIG. 12. The state conductors W, X, Y and 7 represent the full or empty state of successive stages in the control circuit for a FIFO. State conductor W represents the state of the input stage to the FIFO, and state conductor Z represents the state of the output stage of the FIFO. State conductors X and Y represent states of internal stages of the FIFO. The state conductors in this circuit represent the FULL state with a LO signal and the EMPTY state with a HI signal. We call this the "LO-is-FULL," state encoding.

Data in this FIFO flows from left to right through latches 1202, 1206 and 1210 as well as through intervening logic circuits 1204 and 1208. Pulse outputs AA, BB and CC control latches 1202, 1206 and 1210, respectively. Each latch is transparent when its control signal is HI, and opaque otherwise. As we shall see, the circuit generates HI pulses of short duration on the latch drive outputs. These pulses are suitable for moving data through the latches of the FIFO data path.

Three pulse circuits 1212, 1216 and 1217 appear in FIG. 12. Each consists of a NAND gate, three inverters, and one P-type and one N-type drive transistor. These drive transistors can drive the state conductors W, X, Y and Z. Note that although the state conductors X and Y appear short in FIG. 12, in actual use they may be quite long if the pulse circuits are far separated in space.

Each of the pulse circuits responds when it detects that the state to its left is "FULL" and the state to its right is "EMPTY." Using the chosen "LO-is-FULL" state encoding, this corresponds to a LO state conductor to its left and a HI state conductor to its right. It is easy to see that each NAND gate in FIG. 12 responds to this condition. Each NAND gate produces a LO output signal whenever it detects the FULL-EMPTY condition.

The LO output from the NAND gate 1220 does three things. First, by using the P-type drive transistor 1221 to its left, it drives its left state conductor, X, to the HI state. Second, by using the inverter 1222 and the N-type drive transistor 1223 to its right, it drives the right state conductor, Y, to the LO state. And third, using the output inverter 1224, it produces a positive output on the latch drive wire BB. The outputs of the other NAND gates 1225 and 1231 act similarly.

The result of these actions, of course, is to change the former FULL-EMPTY condition of the state conductors to the EMPTY-FULL condition, and to render transparent the corresponding latch so as to move data from the full stage to the formerly empty stage of the FIFO. Of course, the action of the drive transistors 1221 and 1223 on the state conductors X and Y removes the very condition that caused NAND gate 1220 to act, and thus ends the action period of the circuit. After the action period, the drive transistors 1221 and 1223 switch off and the latch control output BB returns to the LO state returning the latches to their normal opaque condition.

Figure 13:
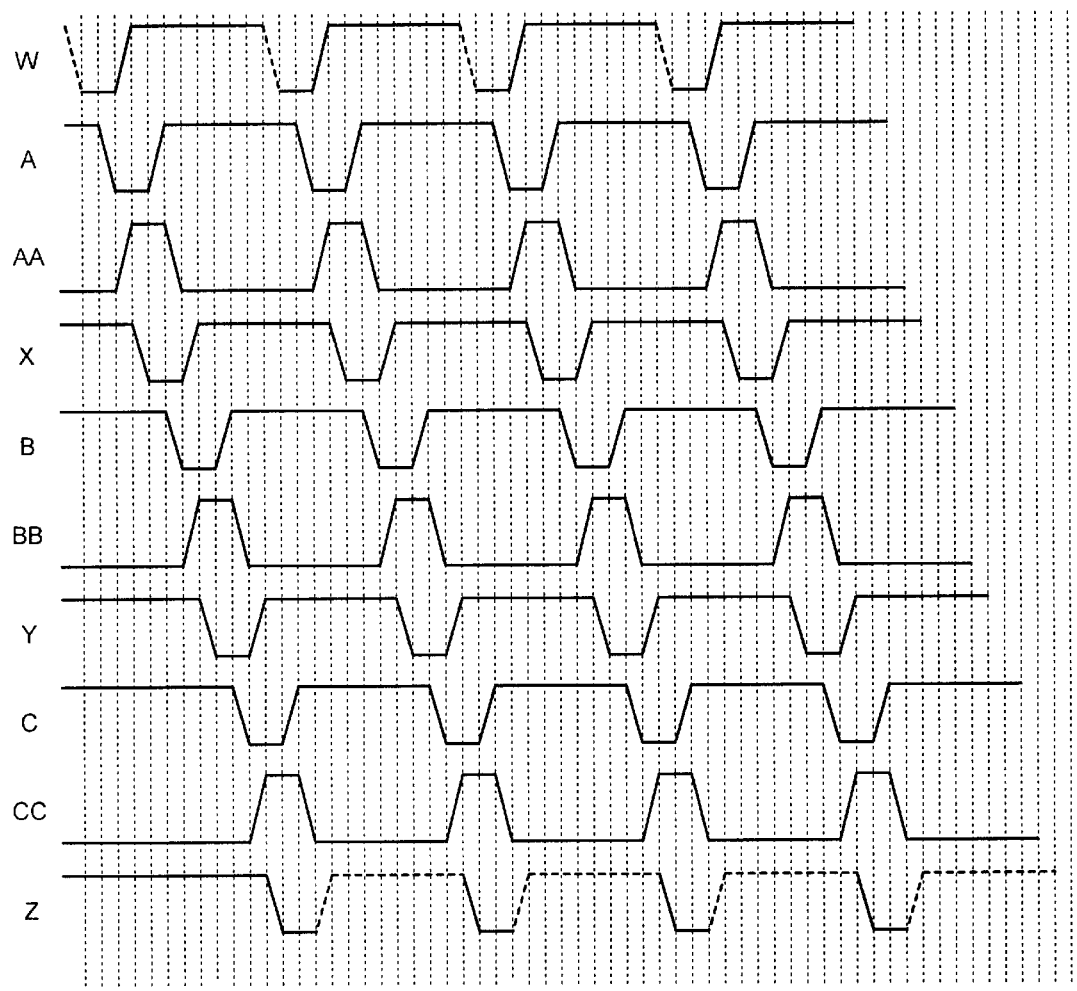
FIG. 13 presents a timing diagram of input-limited operation of the FIFO circuit from FIG. 12 in accordance with an embodiment of the present invention.
Figure 14:
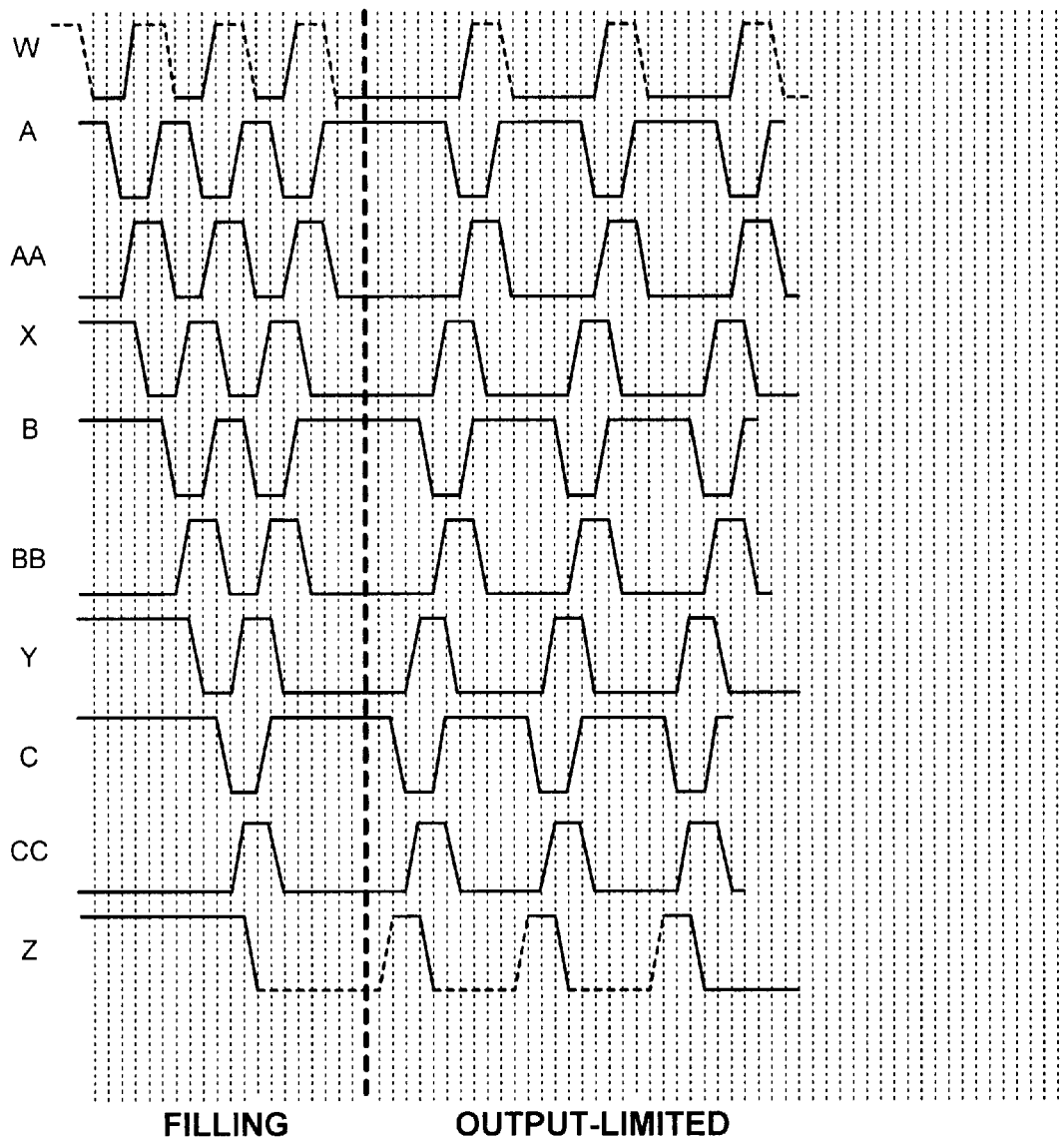
FIG. 14 presents a timing diagram of output-limited operation of the FIFO circuit from FIG. 12 in accordance with an embodiment of the present invention.
Figure 15:
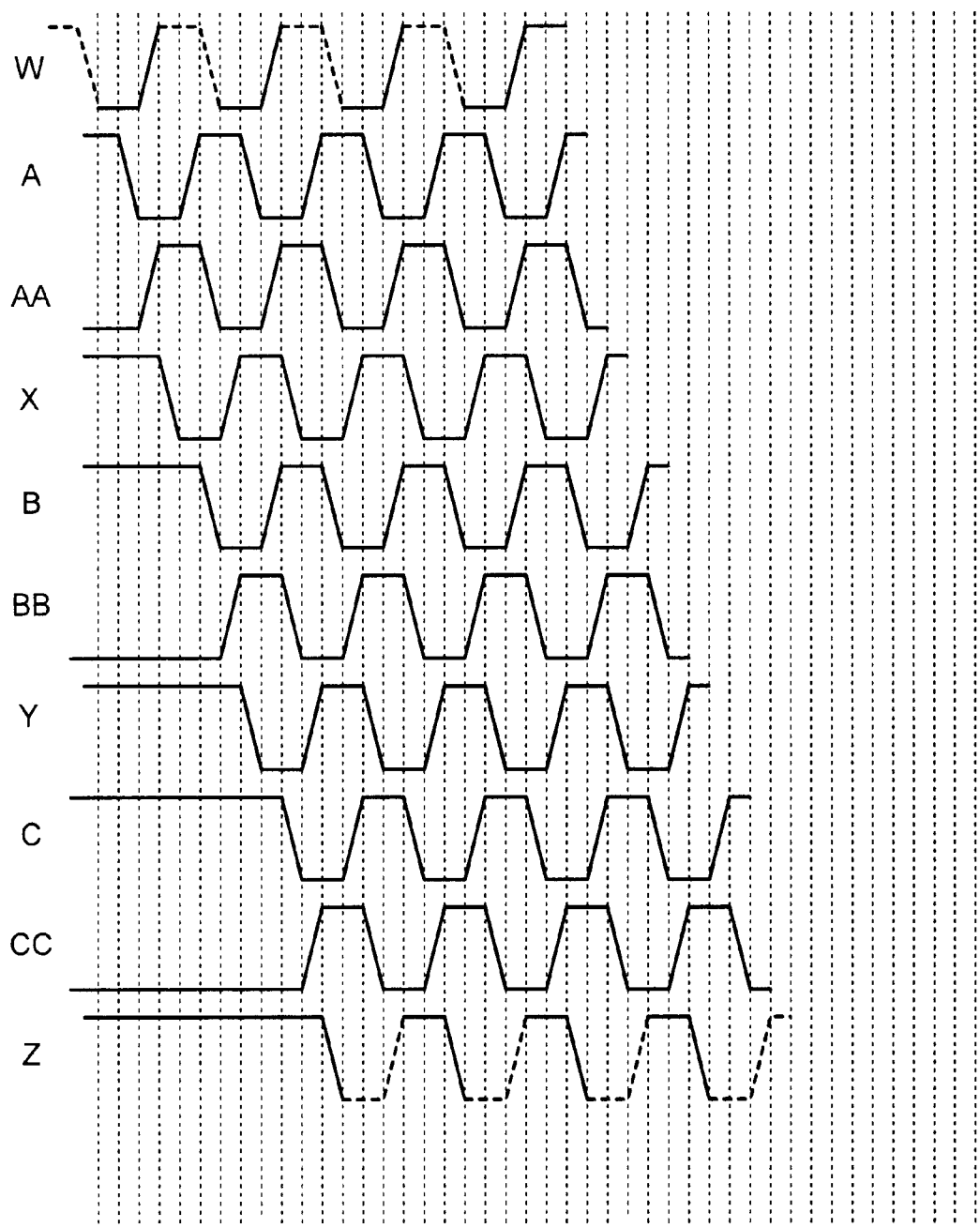
FIG. 15 presents a timing diagram of maximum throughout operation of the FIFO circuit from FIG. 12 in accordance with an embodiment of the present invention.

Consider now the wave forms shown in FIGS. 13–15. The vertical dotted lines represent the passage of time; each line represents one gate delay. Each row of the wave form diagram represents the actions of the signal at the part of the circuit correspondingly labeled.

The wave form shown for state conductor W is partly dotted, as is the wave form for state conductor Z. The dotted pair of these wave forms are caused by circuits (not shown in the figure) that serve to deliver input to the circuit shown and serve to accept output from it. The parts of the circuit shown in FIG. 12 start an action only when state conductor W goes LO, as shown with a dotted line, indicating that input data are available for the FIFO. Circuits not shown in FIG. 12 will drive state conductor W LO at suitable times. Other circuits not shown in FIG. 12 will drive state conductor Z HI at suitable times. For the purposes of illustration these input and output actions happen at different times in the different figures.

Input Limited Action

Referring to FIG. 13, the first set of wave forms, labeled "input limited" show the operation of the circuit for occasional inputs. The FIFO is initially EMPTY as indicated by the HI initial state of state conductors W, X, Y and Z. The input circuits, not shown, drive state conductor W to the LO state, representing FULL, when new data are available. As we will see, the FIFO control accepts each such input datum and passes it along to the FIFO output.

Shortly after state conductor W goes LO, indicating a new input, the output A of NAND gate 1225 goes LO also. This takes two gate delays, one for the inverter 1226 and one for NAND gate 1225 itself.

One gate delay after signal A goes LO, the P-type drive transistor 1227 returns state conductor W to the HI state. Thus, state conductor W remains LO for only three gate delays. State conductor W appears to produce a series of LO pulses. Remember, however, that the leading edge of each such pulse, shown as the dotted descending line, is the result of the action of an N-type drive transistor, not shown. In contrast, only the trailing edge, which rises, is a result of the action of the first NAND gate 1225 and its P-type drive transistor 1227.

Each time signal A goes LO, it also drives state conductor X to the LO state, indicating FULL. This takes two gate delays, of course, one for the inverter 1228 and one for the N-type drive transistor 1229.

Next, the state change of both state conductor W and state conductor X remove the inputs from the NAND gate 1225, and so its output, A, returns to the HI state, promptly shutting off the drive transistors 1227 and 1229. The result is a short LO pulse on signal A. The length of this pulse is set by the delay in the two loop connections, one just to the left and one just to the right of the NAND gate 1225. NAND gate 1225 will shut off, making its output A be HI, whenever the first of these loops completes its action. The circuit will operate best when the timing of these two loops is well matched as is shown in the wave forms of the figures.

The LO pulse on signal A produces a corresponding HI pulse on output AA, one gate delay later. This pulse makes the latches 1202 connected to output AA momentarily transparent and then returns them to their normal opaque state. During their moment of transparency, the latches will copy the input data to their outputs.

Notice that the second pulse circuit 1216 with NAND gate 1220 provides a similar action. The wave forms B, BB and Y are similar to those of A, AA and X, but occur 4 gate delays later. We can count the four gate delays involved in passing a falling edge on state conductor X to a falling edge on state conductor Y. They are inverter 1230, NAND gate 1220, inverter 1222, and the N-type drive transistor 1223. We say that the "forward latency" of this control circuit is four gate delays per stage. The forward latency shown in FIG. 13 applies only to the leading, i.e. falling, edge of the wave forms W, X, Y and Z. The rising edges of the wave forms on state conductors X and Y are the result of actions internal to each pulse circuit. Although they follow with the same delay in FIG. 13, they need not always do so.

The final pulse circuit 1217 (with NAND gate 1231 producing signal C) drives state conductor Z to the LO state whenever data becomes available in the output stage of the FIFO. This action is shown as the solid part of wave form Z. Suitable circuits, not shown, drive state conductor Z HI again as each datum is removed from the output stage of the FIFO. In the next example we will see what happens if the removal signals are delayed.

Thus, for actions limited by the available input rate each signal carries a series of pulses. The outputs of the NAND gates, A, B and C are truly pulses, because whenever the output of a NAND gate goes LO, it acts to remove the inputs from the NAND gate. By controlling the width of the transistors responsible for this action we can control the duration of the pulse outputs of the NAND gates. The pulses on signals AA, BB and CC are a direct result of the pulses on the output of the corresponding NAND gates.

However, the pulses on the state conductors W, X, Y and Z are the result of a more complex interaction. The pulses on the state conductors are the result of each subsequent stage of the FIFO promptly removing data from its predecessor. For example, the falling edges of state conductor X are the result of actions by the N-type drive transistor 1229 which is a part of the leftmost pulse circuit 1212. However, the rising edges of state conductor X are the results of actions by the P-type drive transistor 1221 which is a part of the center pulse circuit.

Notice that wave forms W, X, Y and Z are predominantly HI indicating EMPTY. This indicates that the FIFO is usually EMPTY and awaits data from its input. Each input data element flows through the FIFO in a pattern of pulses as shown in the figure.

Output Limited Operation

The wave forms of FIG. 14 show the same circuit operating with its output data rate limited. The input device, not shown, drives state conductor W LO, indicating FULL, as quickly as it can. However, the output device, not shown, responsible for driving state conductor Z to the HI state, indicating EMPTY, is less prompt in its action.

FIG. 14 shows two distinct intervals of operation separated by a dark dashed vertical line. Before the dark line is the "filling" interval during which the FIFO fills up. After the dark line is the "operating" interval during which the FIFO responds each time a data element is removed from it. In this example, the input and output actions, the dotted portions of wave forms W and Z, occur in such a pattern as to create these two distinct intervals of operation.

During the filling interval, state conductor W presents the FIFO with four inputs in rapid succession; these are the four initial dotted descending transitions on state conductor W. However, the fifth such input must wait because the state conductor W remains LO for an extended period.

During the filling interval likewise, state conductor X, one stage later in the FIFO, gets three inputs in rapid succession, and state conductor Y, one stage later yet, gets two. These are indicated by the descending parts of their respective wave forms. State conductor Z gets only one input, as indicated by its first descending edge. It thereupon becomes FULL and remains so until the operating interval.

At the time represented by the dark vertical line the FIFO is full and cannot act further. Notice that each state conductor is LO, indicating FULL. Action now awaits removal of a data element from the FIFO.

The first action in the operating interval is the first rising dotted line in wave form Z. The circuits, not shown, that create this rise thus indicate that the output of the FIFO has been received. The rise of state conductor Z indicates that the output stage of the FIFO is EMPTY, and may be refilled by actions of the rightmost pulse circuit. Because a data element already waits in the next to last stage of the FIFO, NAND gate 1231 can fire as indicated by wave form C going LO. This, in turn moves state conductor Z to the LO state, indicating FULL, and state conductor Y to the HI state, indicating EMPTY. Now NAND gate 1220 can act, producing a similar pulse on signal B. Shortly thereafter, NAND gate 1225 can act, producing a similar pulse on signal A.

Thus, during the operating interval the action occurs from output to input. Just as cars on an over-crowded freeway move only when a space appears in front of them, so data elements move forward in response to each removal of the data item in front of them. Thus, we see that during the operating interval, wave form Y is a copy of wave form Z, but delayed by two gate delays. Likewise, wave form X is similarly delayed two gate delays from wave form Y, and so on.

We can see that "bubbles", or empty stages, travel through the FIFO from right to left at only two gate delays per stage. Let us count the two gate delays for a rising transition to go from state conductor Y to state conductor X. They are the NAND gate 1220 producing signal B, and the P-type drive transistor 1221 driving X. We say that the "reverse latency" of this circuit is two gate delays per stage.

Notice that during the operating interval the state conductors X, Y, Z and W are mostly LO indicating FULL. The FIFO is mostly full of data and only occasionally acts as a "bubble" flows through it from right to left.

Maximum Throughput Operation

What would happen if the input and output circuits omitted from the diagrams were to operate as fast as possible? The wave forms of FIG. 15 show the resulting operation. Notice that the state conductors W, X, Y, and Z spend half the time indicating "FULL" and half indicating "EMPTY."

Each part of the circuit exhibits an oscillatory behavior with the same characteristic frequency. It takes six gate delays to complete each cycle of operation, exactly the frequency of a ring oscillator composed of three inverters. Indeed, circuits of this type are, in effect, groups of ring oscillators coupled through the AND function offered by the NAND gates 1225, 1220 and 1231 that they share. In FIGS. 13 and 14 we saw the state conductors waiting in a state appropriate to the actions of the FIFO, waiting in the EMPTY state in FIG. 13 and waiting in the FULL state in FIG. 14. In FIG. 15, everything, is operating as fast as possible and the state conductors spend half of the time FULL and half EMPTY. Because all parts are running at full speed, the state conductors act in the regular pattern shown.

It is worth looking at the phases of the various signals. Notice that state conductor Y copies the pattern of state conductor X, four gate delays later, the forward latency. Of course, because the cycle is six gate delays long, state conductor X may be thought of as following Y by two gate delays, the reverse latency. It has long been known that the cycle time of an asynchronous FIFO is the sum of its forward and reverse latencies.

HI-is-Full Circuit

The circuits of FIGS. 1 and 2 can be combined to form the control for a first in first out (FIFO) circuit. The complete circuit for three stages of such a FIFO appears in FIG. 16. The state conductors are labeled W, X, Y and Z.

This circuit uses the "HI is FULL" state encoding for its state wires, just the reverse of the previous circuit. Again each AND function should respond to the condition FULL-EMPTY, but this time that condition is indicated by the adjacent state conductors being in the HI-LO states.

Unlike the circuit of FIG. 12, in the circuit of FIG. 16, the AND function appears in two separate parts. One part consists of the NAND gate 1606 and the other part consists of the two series N-type drive transistors 1604 and 1605. Remember that a NAND gate also has two series N-type transistors inside it whose inputs are wired in parallel with the inputs to the two series drive transistors 1604 and 1605. Thus, when the output of NAND gate 1606 drives towards LO, the two series drive transistors 1604 and 1605 will likewise drive state wire X towards LO.

Input Limited Action

Figure 17:
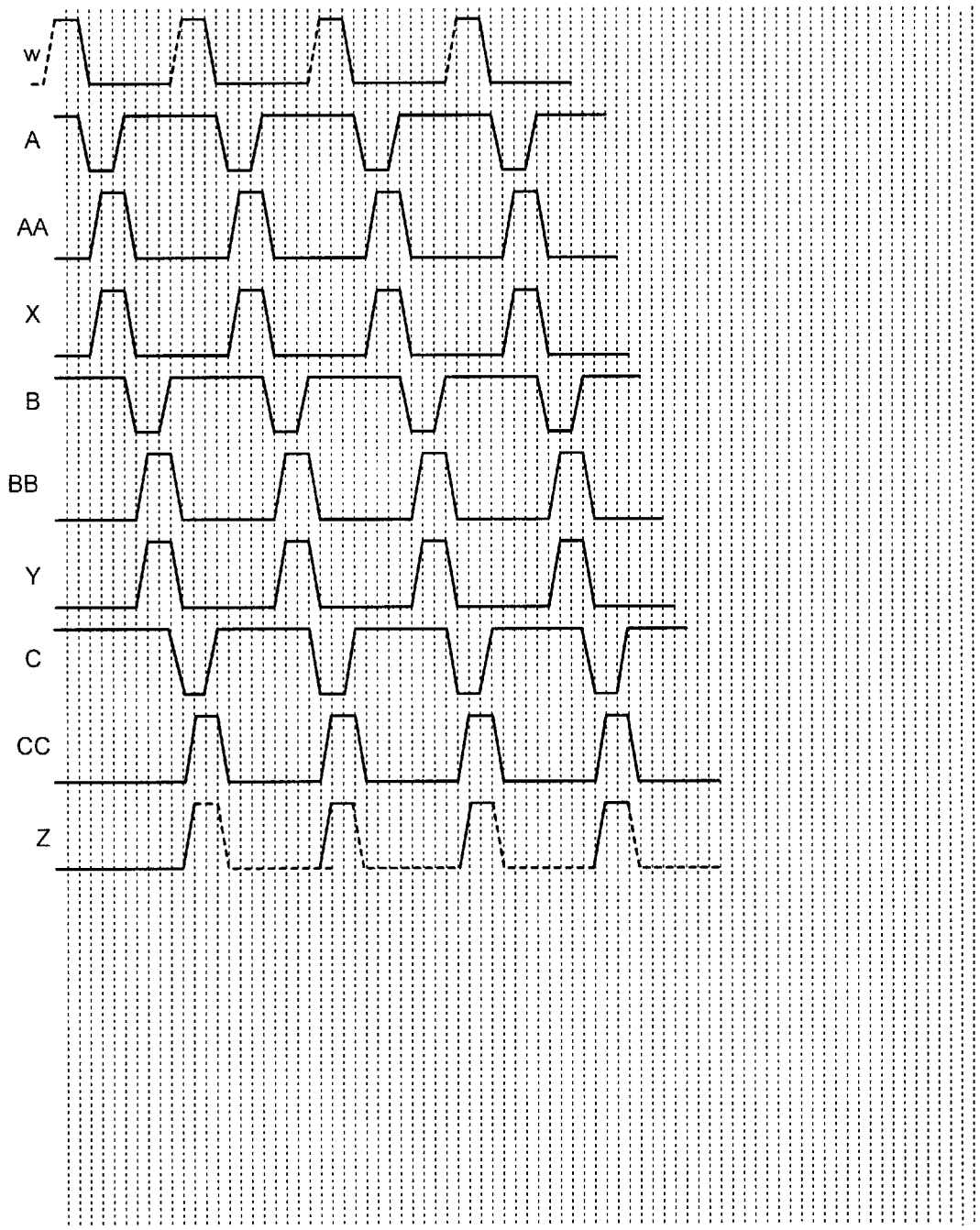
FIG. 17 presents a timing diagram of input-limited operation of the FIFO circuit from FIG. 16 in accordance with an embodiment of the present invention.

FIG. 17 illustrates the operation of the FIFO control when responding to occasional inputs from the left. Initially all of the state signals, W, X, Y and Z are LO indicating EMPTY, because the FIFO is initially EMPTY.

The dotted portions of wave form W are rising transitions caused by circuits not shown in the figure. Each corresponds to the arrival of a new data element at the input of the FIFO. It is easy to see from FIG. 17 that each such arrival causes the FIFO control to pass action from stage to stage from left to right. Notice that the signals A, B, and C are exactly like those of FIG. 13, as are the signals AA, BB, and CC.

This circuit features a different relationship between the state conductors and the NAND gates. Where before there was only a single inverter between state conductor X and the NAND gate 1601, there are now two. Thus the state wire must change state one gate delay earlier in this circuit to achieve the same timing in the NAND gates. Notice that not only are the state conductor wave forms W, X, Y and 7 in FIG. 17 inverted with respect to those of FIG. 13, but they are also one gate delay earlier. Thus, for example, the rising edges of wave form X coincides with the rising edge of wave form AA in FIG. 17 whereas in FIG. 13 the corresponding wave form was not only inverted, but also one gate delay later.

Nevertheless, the general pattern of FIG. 17 is similar to that of FIG. 13. Each input event at state conductor W causes a series of pulses to travel through the FIFO, ultimately delivering data to the FIFO output.

Output Limited Action

Figure 18:
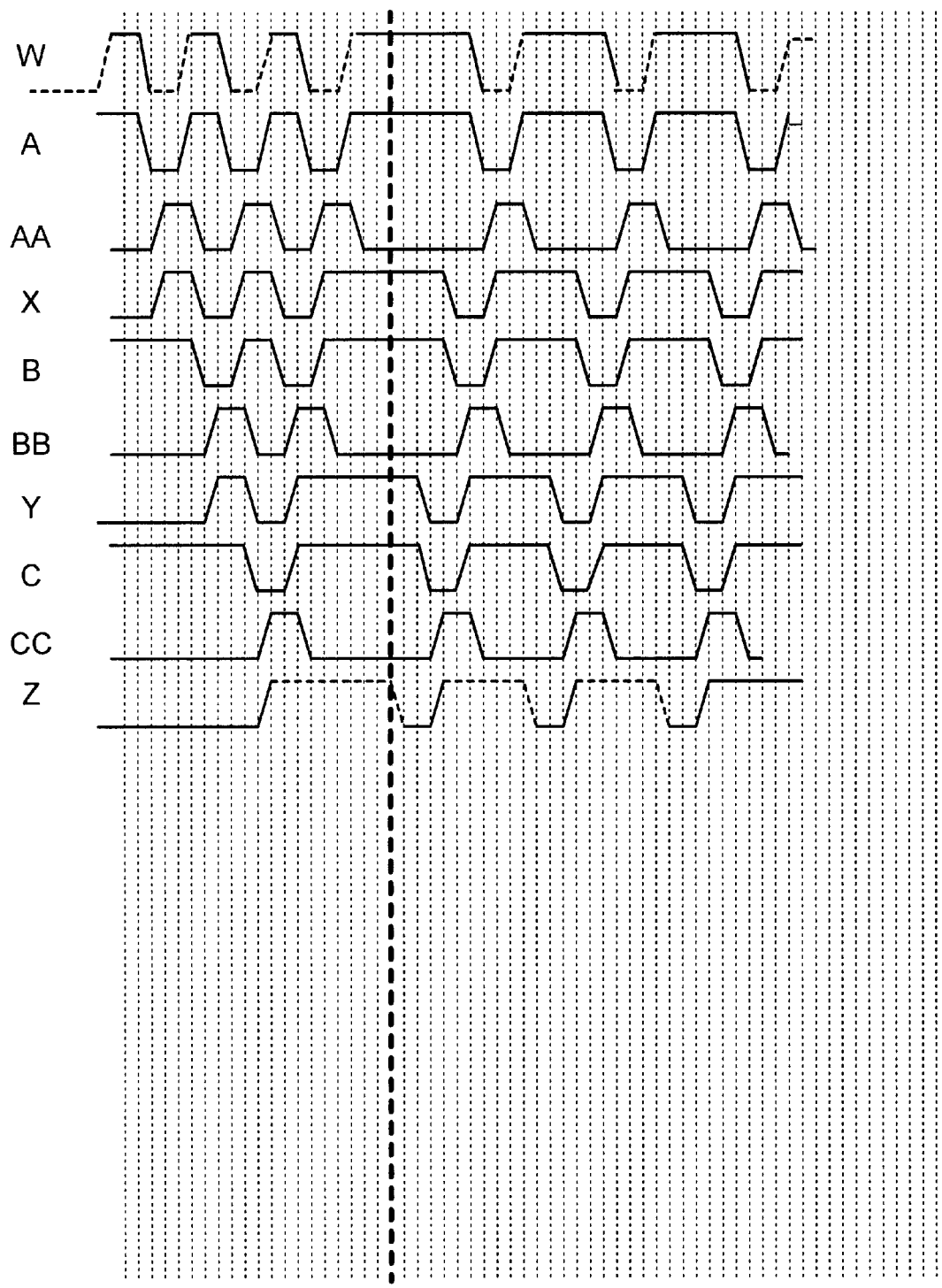
FIG. 18 presents a timing diagram of output-limited operation of the FIFO circuit from FIG. 16 in accordance with an embodiment of the present invention.

Like FIG. 13, FIG. 18 shows the operation of the circuit in two distinct intervals of operation separated by a dark dashed vertical line. These, again, are the "filling interval" and the "operating interval." During the filling interval successively fewer events reach successive stages of the FIFO as it fills. Notice that the state conductors X, Y, Z, and W are initially LO, indicating EMPTY. At the dark vertical line they are all HI, indicating FULL because the FIFO is now completely FULL.

During the operating interval, the FIFO action is limited by the rate at which the output circuits, not shown, remove elements from the FIFO by driving state conductor Z to the LO state. Three cycles of such operation appear in FIG. 18. Notice that following each of them the stages act in succession from right to left. They are, of course, passing a "bubble" towards the input of the FIFO, making room for each entry to move forward and ultimately room for another entry to come in from the left.

Again the "forward latency" of this circuit is four gate delays. We can count the gates involved in propagating a rising edge from state conductor X to state conductor Y. The gates are inverter 1607, inverter 1608, the NAND gate 1606, and the P-type driver transistor 1610.

Again the "reverse latency" of this circuit is two gate delays. We can count the gates involved in propagating a falling edge from state conductor Y to state conductor X. The gates are the inverter 1611 and the pair of series N-type transistors 1604 and 1605 that drive the state conductor X towards LO.

Maximum Throughput Operation

Figure 19:
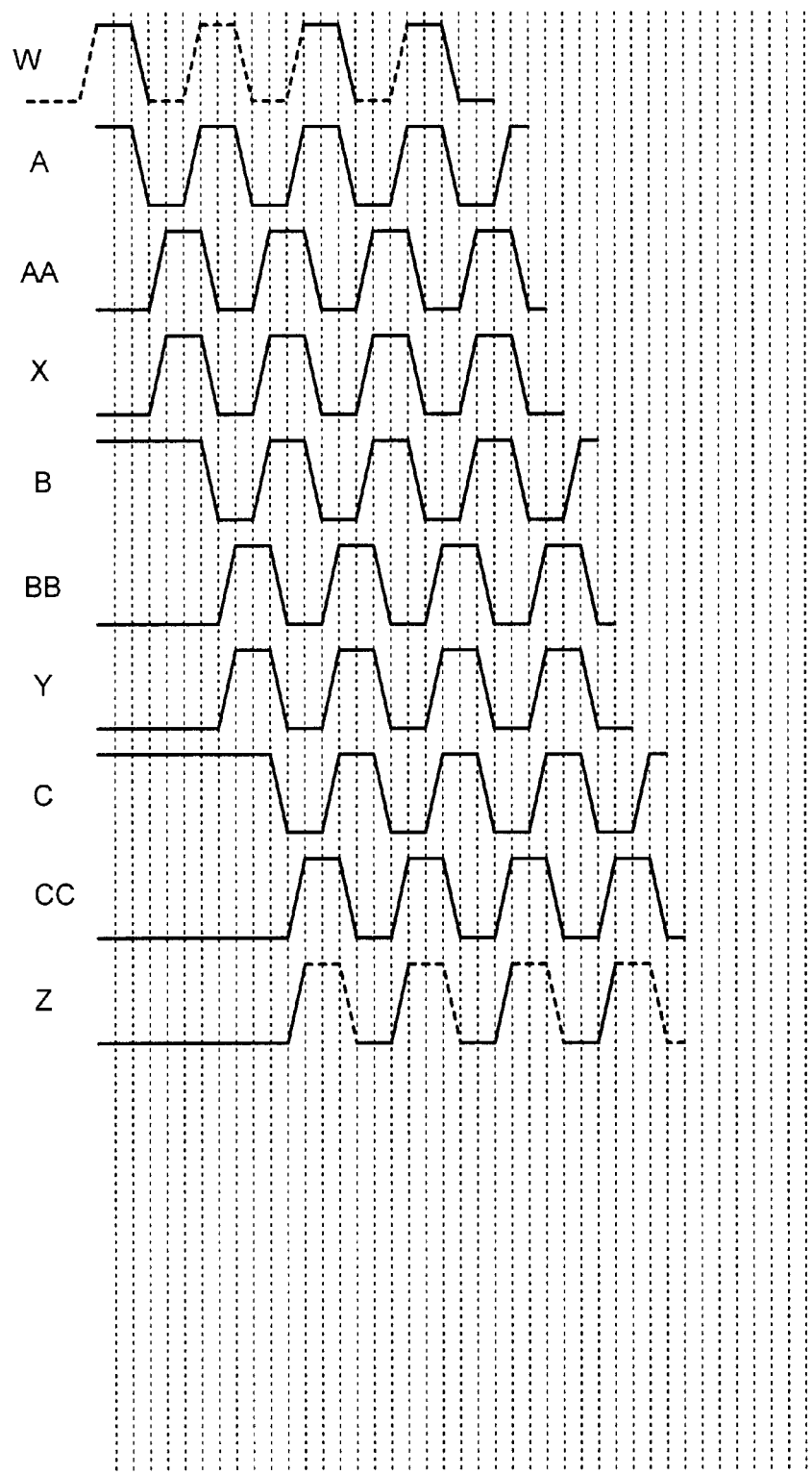
FIG. 19 presents a timing diagram of maximum throughput operation of the FIFO circuit from FIG. 16 in accordance with an embodiment of the present invention.

Referring to FIG. 19, if both input and output circuits, not shown, drive state conductor W towards 141 and state conductor Z towards LO at appropriate times, the circuit will operate at its maximum throughput. In this case, all parts of the circuit operate like ring oscillators coupled at the gates that do the AND function. Remember that in this circuit there are two places that do the AND function. One is the NAND gate, the other is the pair of series N-type transistors.

The resulting wave forms look much like those of FIG. 15. Here, however, the state conductors are both inverted and one gate delay advanced from those of the earlier figure.

The HI is FULL form has a number of advantages over the LO is FULL form.

First, there is at least one inverter between each state conductor and the inputs to the NAND gate and the pair of series N-type transistors. We can control the switching levels of these transistors to control the response of the circuit to changes in the state of the state conductors. Recall that although the state conductors appear short in these figures, they may actually span a large distance. Thus, for example, inverters 1612 and 1607 in FIG. 16 that both take inputs from the state conductor X may be far separated.

Second, because the state conductors in 111 is FULL form act one gate delay earlier than those in the LO is FULL form, there is time for more amplification between the state conductors and the latch drive outputs like BB. From state conductor X to output BB you will find four gates (inverters 1607 and 1608, NAND gate 1606, and inverter 1613) in the circuit of FIG. 16, but only three gates (inverter 1230, NAND gate 1220, and inverter 1224) in the circuit of FIG. 12. Thus, for equal power level at the latch drive outputs, the HI is FULL form requires less power in the state conductors.

Third, the presence of two inverters in series, like inverter 1607 and inverter 1608, in this circuit is a major help in some applications. For example, the arbitration circuit of FIG. 11 replaces these two inverters with a mutual exclusion element and its anti-metastability gates. Various branch and merge circuits replace one or both of these inverters with NAND gates to combine the inputs from several converging paths.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for controlling asynchronous data transfers within a circuit, comprising:

monitoring a first voltage level on a first conductor that specifies whether a first stage of the circuit contains data;

monitoring a second voltage level on a second conductor that specifies whether a second stage of the circuit contains data;

upon detecting that the first voltage level indicates that first stage contains data to be transmitted to the second stage, and that the second voltage level indicates that the second stage does not contain data, and is therefore available to receive data from the first stage, transferring the data from the first stage to the second stage by, generating a second stage latch signal to latch data into the second stage from the first stage, changing the first voltage level to indicate that the first stage no longer contains data, and changing the second voltage level to indicate that the second stage contains data.

2. The method of claim 1, further comprising:

monitoring the second voltage level on the second conductor;

monitoring a third voltage level on a third conductor that specifies whether a third stage of the circuit contains data;

upon detecting, that the second voltage level indicates that second stage contains data to be transmitted to the third stage, and that the third voltage level indicates that the third stage does not contain data, and is therefore available to receive data from the second stage, transferring the data from the second stage to the third stage by, generating a third stage latch signal to latch data into the third stage from the second stage, changing the second voltage level to indicate that the second stage no longer contains data, and changing the third voltage level to indicate that the third stage contains data.

3. The method of claim 2, wherein a first end of the second conductor is coupled to a second stage controller;

wherein a second end of the second conductor is coupled to a third stage controller;

wherein the second stage controller drives the first end of the second conductor to change the second voltage level to indicate that the second stage contains data: and wherein the third stage controller drives the second end of the second conductor to change the second voltage level to indicate that the second stage no longer contains data.

4. The method of claim 3, further comprising using a keeper circuit to hold the second voltage level on the second conductor at a stable value, unless the second voltage level is changed by the second stage controller or the third stage controller.

5. The method of claim 1, wherein generating the second stage latch signal involves generating a pulse to latch data into the second stage from the first stage.

6. The method of claim 1, wherein changing the second voltage level to indicate that the second stage contains data involves:
   driving the second conductor with a drive transistor; and
   cutting off the drive transistor after a fixed time period through use of a cycle of logical inversions.

7. The method of claim 6, wherein the cycle of logical inversions includes three inversions.

8. The method of claim 6, wherein the cycle of logical inversions includes five inversions.

9. The method of claim 6, wherein the cycle of logical inversions includes an odd number of inversions.

10. An apparatus for controlling asynchronous data transfers within a circuit, comprising:
    a first conductor that carries a first voltage that specifies whether a first stage of the circuit contains data;
    a second conductor that carries a second voltage that specifies whether a second stage of the circuit contains data;
    a second stage controller coupled to the first conductor and the second conductor;
    wherein upon detecting that the first voltage indicates that first stage contains data to be transmitted to the second stage, and that the second voltage indicates that the second stage does not contain data, and is therefore available to receive data from the first stage, the second stage controller is configured to,
        generate a second stage latch signal to latch data into the second stage from the first stage,
        drive the first voltage on the first conductor to indicate that the first stage no longer contains data, and to
        drive the second voltage on the second conductor to indicate that the second stage contains data.

11. The apparatus of claim 10, further comprising:
    a third conductor that carries a third voltage that specifies whether a third stage of the circuit contains data;
    a third stage controller coupled to the second conductor and the third conductor;
    wherein upon detecting that the second voltage indicates that the second stage contains data to be transmitted to the third stage, and that the third voltage indicates that the third stage does not contain data, and is therefore available to receive data from the second stage, the third stage controller is configured to,
        generate a third stage latch signal to latch data into the third stage from the second stage,
        drive the second voltage on the second conductor to indicate that the second stage no longer contains data, and to
        drive the third voltage on the third conductor to indicate that the third stage contains data.

12. The apparatus of claim 11, further comprising a keeper circuit coupled to the second conductor that holds the second voltage at a stable value, unless the second voltage is changed by the second stage controller or the third stage controller.

13. The apparatus of claim 10, further comprising a pulse generation circuit within the second stage controller that generates a pulse to latch data into the second stage.

14. The apparatus of claim 10, further comprising:
    a drive transistor within the second stage controller that is configured to drive the second voltage on the second conductor to indicate that the second stage contains data;
    a cycle of logical inversions coupled to the drive transistor that is configured to cut off the drive transistor after a fixed time period.

15. The apparatus of claim 14, wherein the cycle of logical inversions includes three inversions.

16. The apparatus of claim 14, wherein the cycle of logical inversions includes five inversions.

17. The apparatus of claim 14, wherein the cycle of logical inversions includes an odd number of inversions.

18. The apparatus of claim 14, wherein the drive transistor includes a series stack of drive transistors.

19. The apparatus of claim 10, wherein the second stage controller includes:
    a NAND-gate, including an output that latches data for the second stage of the circuit;
    a first inverter, including an input coupled to the first conductor and an output coupled to a first input of the NAND-gate;
    a P-type transistor, including a source coupled to a high voltage, a gate coupled to the output of the NAND-gate and a drain coupled to the first conductor;
    a second inverter, including an input coupled to the output of the NAND-gate; and
    an N-type transistor, including a drain coupled to a second input of the NAND-gate and the second conductor, a gate coupled to the output of the second inverter and a source coupled to ground.

20. The apparatus of claim 10, wherein the second stage controller includes:
    a NAND-gate, including an output that latches data for the second stage of the circuit;
    a first inverter, including an input coupled to the second conductor and an output coupled to a second input of the NAND-gate;
    a P-type transistor, including a source coupled to a high voltage, a gate coupled to the output of the NAND-gate and a drain coupled to the second conductor;
    a first N-type transistor including a source coupled to ground;
    a second N-type transistor, including a source coupled to a drain of the first N-type transistor, a gate coupled to the output of the first inverter and a drain coupled to the first conductor; and
    a series of two inverters with an input coupled to the first conductor and an output coupled to a gate of the first N-type transistor, and to a first input of the NAND-gate.

* * * * *